US012671492B2

(12) United States Patent
Matsuda et al.

(10) Patent No.: US 12,671,492 B2
(45) Date of Patent: Jun. 30, 2026

(54) COMMUNICATION DEVICE, COMMUNICATION METHOD, AND COMMUNICATION SYSTEM

(71) Applicant: SONY GROUP CORPORATION, Tokyo (JP)

(72) Inventors: Hiroki Matsuda, Tokyo (JP); Hiromasa Uchiyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 360 days.

(21) Appl. No.: 18/260,379

(22) PCT Filed: Dec. 28, 2021

(86) PCT No.: PCT/JP2021/048746
§ 371 (c)(1),
(2) Date: Jul. 5, 2023

(87) PCT Pub. No.: WO2022/153866
PCT Pub. Date: Jul. 21, 2022

(65) Prior Publication Data
US 2024/0056164 A1 Feb. 15, 2024

(30) Foreign Application Priority Data

Jan. 14, 2021 (JP) ................................. 2021-004281

(51) Int. Cl.
*H04B 7/155* (2006.01)
*H04W 84/06* (2009.01)
(52) U.S. Cl.
CPC ............. *H04B 7/155* (2013.01); *H04W 84/06* (2013.01)

(58) Field of Classification Search
CPC ................. H04L 1/1822; H04L 1/1812; H04L 2001/0097; H04L 1/1896; H04L 1/1864;
(Continued)

(56) References Cited

U.S. PATENT DOCUMENTS 11,411,637 B2 * 8/2022 Hassan Hussein .........................
H04B 7/18526
2013/0077543 A1 3/2013 Kim
2020/0228194 A1 * 7/2020 Hassan Hussein ... H04L 1/1822

FOREIGN PATENT DOCUMENTS

CN 111052652 A * 4/2020 ........... H04L 1/1812
CN 111095835 A * 5/2020 ........... H04L 1/1896
(Continued)

OTHER PUBLICATIONS

International Search Report and Written Opinion of PCT Application No. PCT/JP2021/048746, issued on Apr. 5, 2022, 09 pages of ISRWO.

*Primary Examiner* — Khalid W Shaheed
(74) *Attorney, Agent, or Firm* — CHIP LAW GROUP

(57) ABSTRACT
There is provided a communication device capable of using uni-directional relay communication in which one communication of uplink communication and downlink communication with another communication device is relay communication via a relay station and the other communication is direct communication. The communication device acquires an Hybrid Automatic Repeat Request (HARQ) ID different from at least one of an HARQ ID for communication between the other communication device and the relay station and an HARQ ID for communication between the communication device and the relay station, the HARQ ID being used in end-to-end between the other communication device and the communication device in the uni-directional relay communication.

20 Claims, 19 Drawing Sheets

(58) Field of Classification Search
     CPC ..... H04W 72/23; H04W 72/21; H04W 72/20;
                         H04W 72/12; H04W 72/1263
     See application file for complete search history.

(56)                    References Cited

FOREIGN PATENT DOCUMENTS

| JP | 2020-519166 | A | 6/2020 |
| JP | 2020-535770 | A | 12/2020 |
| WO | WO-2019063108 | A1 | 4/2019 |

* cited by examiner

COMMUNICATION DEVICE, COMMUNICATION METHOD, AND COMMUNICATION SYSTEM

CROSS REFERENCE TO RELATED APPLICATIONS

This application is a U.S. National Phase of International Patent Application No. PCT/JP2021/048746 filed on Dec. 28, 2021, which claims priority benefit of Japanese Patent Application No. JP 2021-004281 filed in the Japan Patent Office on Jan. 14, 2021. Each of the above-referenced applications is hereby incorporated herein by reference in its entirety.

FIELD

The present disclosure relates to a communication device, a communication method, and a communication system.

BACKGROUND

Relay communication via a relay station is sometimes used as communication between communication devices. As one form of relay communication, uni-directional relay communication in which one communication of uplink communication and downlink communication is relay communication and the other communication is direct communication is known.

CITATION LIST

Non Patent Literature

Non Patent Literature 1: TR36.746, "Study on further enhancements to LTE Device to Device (D2D), User Equipment (UE) to network relays for Internet of Things (IoT) and wearables"

SUMMARY

Technical Problem

When communication between communication devices is relay communication, communication performance (for example, delay, throughput, packet loss rate, and the like) is sometimes greatly deteriorated depending on a situation. For example, it is assumed that a base station and a terminal device perform the relay communication. Here, if the base station is a non-ground station such as a satellite station, a propagation path between the base station and the terminal device is assumed to be a long distance. In this case, since a radio wave propagation time becomes long, retransmission processing such as HARQ (Hybrid automatic repeat request) sometimes fails.

Therefore, the present disclosure proposes a communication device, a communication method, and a communication system capable of realizing high communication performance.

Note that the above problem or subject is merely one of a plurality of problems or subjects that can be solved or achieved by a plurality of embodiments disclosed in the present specification.

Solution to Problem

In order to solve the above problem, a communication device according to one aspect of the present disclosure that performs uni-directional relay communication in which one communication of uplink communication and downlink communication with another communication device is relay communication via a relay station and other communication is direct communication, the communication device acquiring an HARQ ID different from at least one of an HARQ ID for communication between the other communication device and the relay station and an HARQ ID for communication between the communication device and the relay station, the HARQ ID being used in end-to-end between the other communication device and the communication device in the uni-directional relay communication.

DESCRIPTION OF EMBODIMENTS

Figure 1:
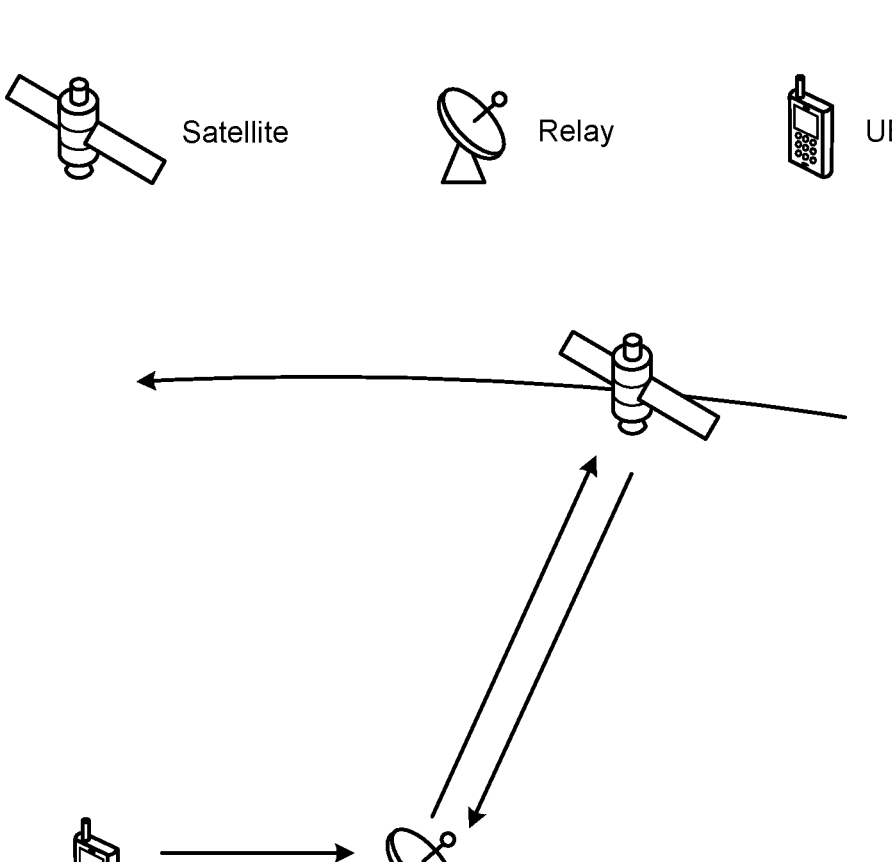
FIG. 1 is a diagram for explaining relay communication.

An embodiment of the present disclosure is explained in detail below with reference to the drawings. Note that, in the embodiment explained below, redundant explanation is omitted by denoting the same parts with the same reference numerals and signs.

In the present specification and the drawings, a plurality of components having substantially the same functional configuration may be distinguished by adding different numbers after the same reference signs. For example, a plurality of components having substantially the same functional configurations are distinguished as terminal devices $50_1$, $50_2$, and $50_3$ according to necessary. However, in a case where it is not particularly necessary to distinguish each of a plurality of components having substantially the same functional configuration, only the same reference numeral is attached. For example, when it is unnecessary to particularly distinguish the terminal devices $50_1$, $50_2$, and $50_3$, the terminal devices $50_1$, $50_2$, and $50_3$ are simply referred to as terminal devices 50.

One or a plurality of embodiments (including examples and modifications) explained below can be respectively implemented independently. On the other hand, at least a part of the plurality of embodiments explained below may be implemented in combination with at least a part of other embodiments as appropriate. These plurality of embodiments can include new characteristics different from one another. Therefore, these plurality of embodiments can contribute to solving subjects or problems different from one another and can achieve different effects.

The present disclosure is explained according to the following item order.

1. Overview
1-1. Problems
1-2. Overview of solutions
2. Configuration of a communication system
2-1. Overall configuration of the communication system
2-2. Configuration of a management Device
2-3. Configuration of a ground station
2-4. Configuration of a non-ground station
2-5. Base station
2-6. Configuration of a relay station
2-7. Configuration of a terminal device
3. Operation of the communication system
3-1. Overview of processing
3-2. Uplink uni-directional relay
3-2-1. Uplink data transmission
3-2-2. Downlink data transmission
3-3. Downlink uni-directional relay
3-3-1. Downlink data transmission
3-3-2. Uplink data transmission
3-4. Summary and supplementation
3-4-1. Definition of an HARQ ID for E2E
3-4-2. Notification of information between the terminal device and the relay station by the base station
3-4-3. Processing in the case in which handover occurs
3-4-4. Frequency band examples of links
4. Modifications
5. Conclusion

1. Overview

Radio access technologies (RATs) such as LTE (Long Term Evolution) and NR (New Radio) have been studied in the 3GPP (3rd Generation Partnership Project). The LTE and the NR are types of a cellular communication technology and enable mobile communication of a terminal device by arranging a plurality of areas covered by a base station in a cell shape. At this time, a single base station may manage a plurality of cells.

Note that, in the following explanation, it is assumed that "LTE" includes LTE-A (LTE-Advanced), LTE-A Pro (LTE-Advanced Pro), and EUTRA (Evolved Universal Terrestrial Radio Access). The NR includes NRAT (New Radio Access Technology) and FEUTRA (Further EUTRA). Note that a single base station may manage a plurality of cells. In the following explanation, a cell adapted to the LTE is referred to as LTE cell and a cell adapted to the NR is referred to as NR cell.

The NR is a next generation (fifth generation) radio access technology (RAT) of the LTE. The NR is a radio access technology that can cope with various use cases including eMBB (Enhanced Mobile Broadband), mMTC (Massive Machine Type Communications), and URLLC (Ultra-Reliable Low Latency Communications). The NR has been studied aiming at a technical framework adapted to usage scenarios, requirement conditions, arrangement scenarios, and the like in these use cases.

Further, in the NR, studies on a non-terrestrial network (NTN) have started because of an increase in demands for wide area coverage, connection stability, and the like. In a non-terrestrial network, a wireless network is planned to be provided to a terminal device via a base station other than a ground station such as a satellite station or an aircraft station. The base station other than the ground station is referred to as non-ground station or non-ground base station. A wireless network provided by the ground station is referred to as a terrestrial network (TN). By using the same radio access scheme for the terrestrial network and the non-terrestrial network, integrated operation of the terrestrial network and the non-terrestrial network becomes possible.

1-1. Problems

Relay communication via a relay station is sometimes used as communication between communication devices. For example, relay communication via a relay station is sometimes used as communication between a terminal device and a non-ground station.

FIG. 1 is a diagram for describing the relay communication. FIG. 1 illustrates a satellite station (satellite illustrated in FIG. 1) as a non-ground station. FIG. 1 illustrates a state in which the satellite station and a terminal device (UE illustrated in FIG. 1) perform the relay communication via a relay station (relay illustrated in FIG. 1). In an example illustrated in FIG. 1, both of an uplink and a downlink are the relay communication.

In relay communication currently under review, it is considered to secure acknowledgement (ACK)/negative acknowledgement (NACK) for each of links (a link between the satellite station and the relay station and a link between the relay station and the terminal device). That is, since the ACK/NACK is transmitted from the relay station, the terminal device can learn whether data has arrived at the relay station. However, since the ACK/NACK does not arrive from the non-ground station, the terminal device does not learn whether the data has arrived at the satellite station.

Figure 2:
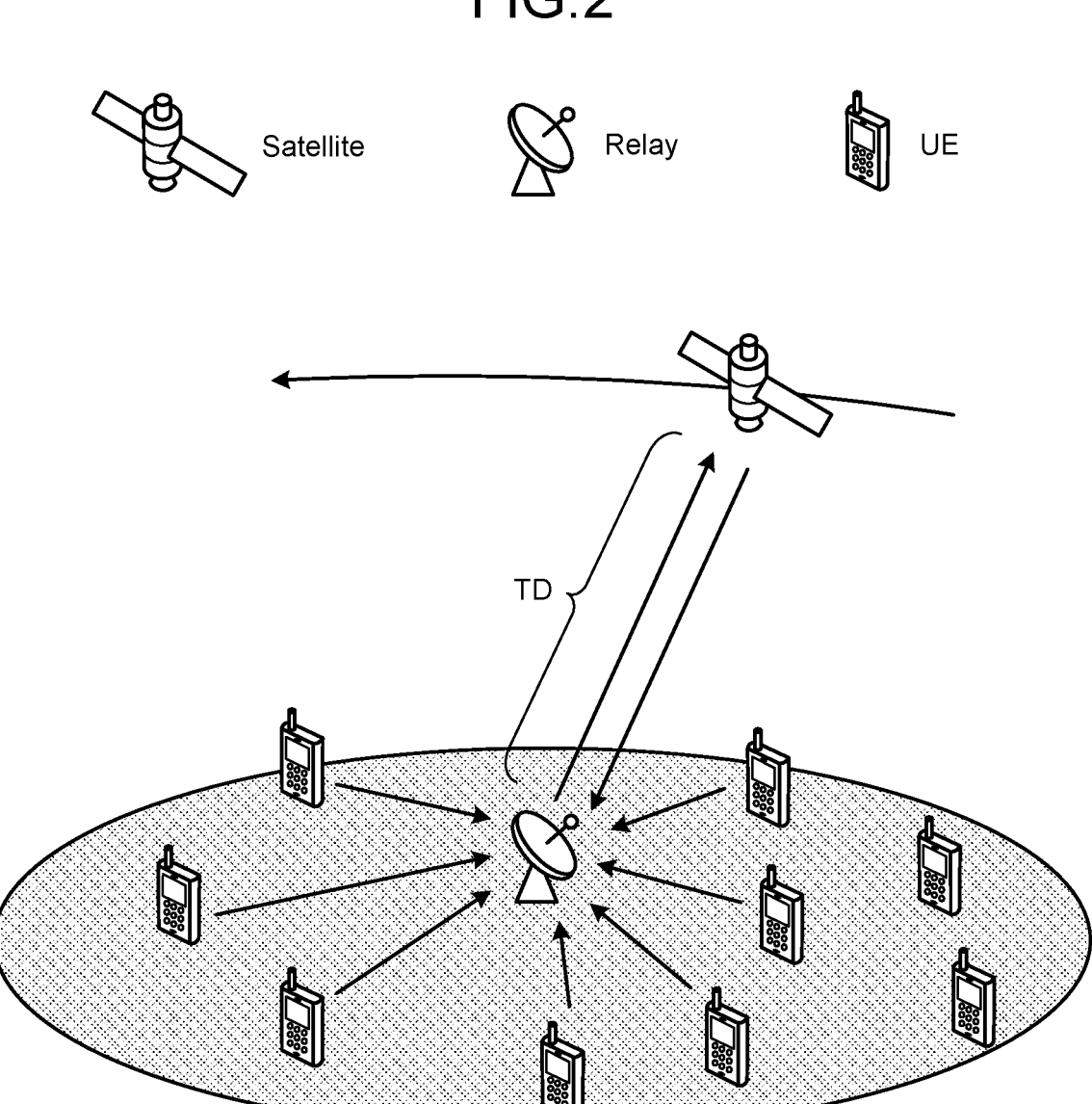
FIG. 2 is a diagram indicating that a propagation distance between a terminal device and a non-ground station is long.

A characteristic of a non-terrestrial network is that a propagation distance is longer compared with that of ground communication. FIG. 2 is a diagram indicating that a propagation distance TD between the terminal device and the non-ground station is long. In the non-terrestrial network, feedback (ACK/NACK or the like) for data transmitted to the satellite station by the relay station is considered to be delayed because of the length of the propagation distance. In HARQ, it is necessary to hold transmission data in a transmission buffer until communication is successful. However, since the relay station relays communication of many terminal devices, when feedback from the satellite station is delayed, a problem in that a transmission buffer overflows occurs.

Figure 3:
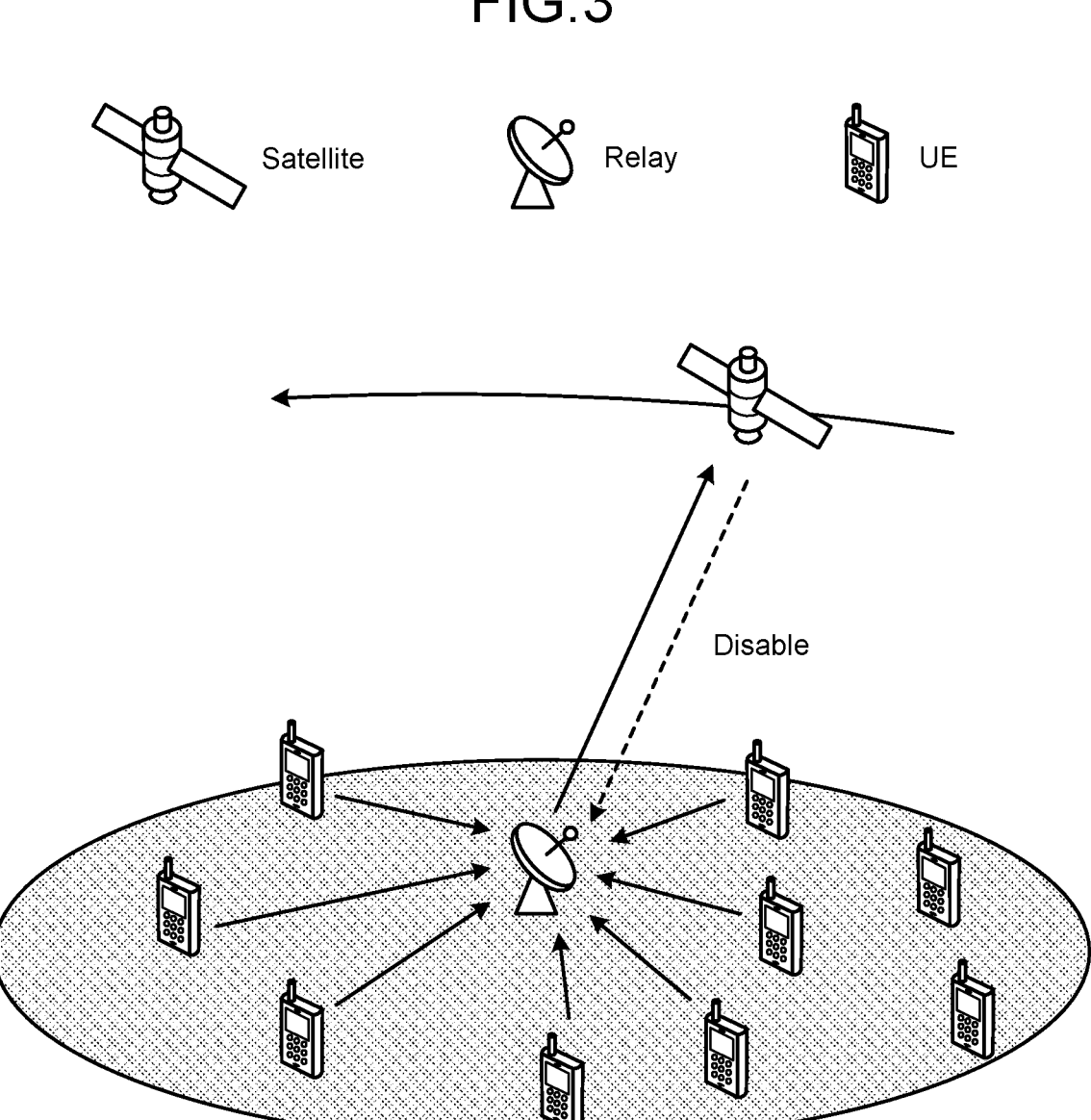
FIG. 3 is a diagram illustrating a state in which HARQ feedback between a satellite station and a relay station is disabled.

It is assumed to cope with the above problem (the overflow of the transmission buffer) by disabling HARQ feedback between the satellite station and the relay station. FIG. 3 is a diagram illustrating a state in which the HARQ feedback between the satellite station and the relay station is disabled.

However, when this solution is adopted, communication performance (for example, delay, throughput, packet loss rate, and the like) is greatly deteriorated depending on a situation. For example, in this solution, when transmission failure occurs, since a packet is retransmitted by an upper layer, a large delay occurs until the retransmission. Low earth orbiting satellites and the like always move at high speed in the sky. It is likely that the relay station and the terminal device are out of coverage or out of sight at the time of the retransmission. As a result, a case is conceivable in which data transmitted by the terminal device does not reach the satellite station.

1-2. Overview of a Solution

Therefore, in the present embodiment, the above problem is solved by means explained below.

For example, the communication system according to the present embodiment is a communication system including a non-ground station, a relay station, and a terminal device, communication between the non-ground station and the terminal device being uni-directional relay communication. In the present embodiment, the non-ground station and the terminal device are enabled to perform end-to-end (End-to-End) retransmission processing.

For example, the non-ground station acquires an HARQ ID (hereinafter also referred to as end-to-end HARQ ID) different from at least one of an HARQ ID for communication between the terminal device and the relay station and an HARQ ID for communication between the non-ground station and the relay station, the HARQ ID being used in end-to-end between the terminal device and the non-ground station in uni-directional relay communication. The non-ground station performs the uni-directional relay communication with the terminal device using the end-to-end (hereinafter referred to as E2E) HARQ ID. The HARQ ID is, for example, an HARQ process ID.

Figure 4:
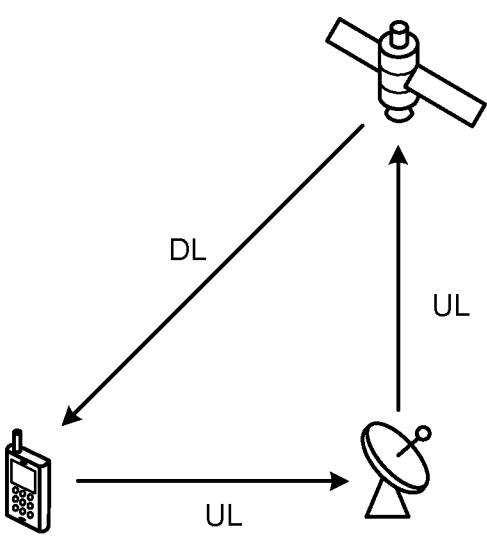
FIG. 4 is a diagram illustrating uplink uni-directional relay.
Figure 5:
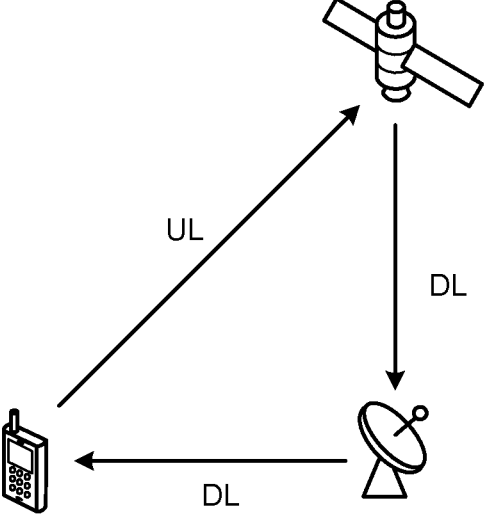
FIG. 5 is a diagram illustrating downlink uni-directional relay.

Note that the uni-directional relay is a communication scheme in which one of an uplink and a downlink is relay communication and the other link is direct communication. FIG. 4 is a diagram illustrating uplink uni-directional relay. FIG. 5 is a diagram illustrating downlink uni-directional relay. As illustrated in FIG. 4, the uplink uni-directional relay is uni-directional relay in which the uplink is the relay communication and the downlink is the direct communication. As illustrated in FIG. 5, the downlink uni-directional relay is uni-directional relay in which the downlink is the relay communication and the uplink is the direct communication.

For example, in the uplink uni-directional relay illustrated in FIG. 4, it is conceived that the non-ground station and the terminal device perform uplink communication. In this case, the non-ground station acquires an E2E HARQ ID between the terminal device and the non-ground station that is different from an HARQ ID of at least one of an HARQ ID for communication between the terminal device and the relay station and an HARQ ID for communication between the relay station and the non-ground station. Then, when the uplink communication of the terminal device is unsuccessful, the non-ground station transmits NACK related to the E2E HARQ ID to the terminal device by direct communication not via the relay station.

Consequently, even in an environment in which an HARQ between the non-ground station and the relay station is disabled, end-to-end retransmission processing can be performed in a PHY layer and a MAC layer. In addition, since the terminal device or the non-ground station can quickly learn success/failure of communication not via the relay station, the terminal device or the non-ground station can quickly execute the retransmission processing. As a result, since a delay relating to the retransmission processing decreases, the communication system can realize high communication performance.

The overview of the present embodiment is explained above. The communication system according to the present embodiment is explained in detail below.

2. Configuration of the Communication System

First, a configuration of a communication system 1 of the present embodiment is explained.

The communication system 1 is a cellular communication system using a radio access technology such as the LTE or the NR and provides wireless communication to a terminal device on the ground via a non-ground station (for example, a satellite station or an aircraft station). If the non-ground station is the satellite station, the communication system 1 may be a Bent-pipe (Transparent) type mobile satellite communication system. A radio access scheme used by the communication system 1 is not limited to the LTE and the NR and may be another radio access scheme such as W-CDMA (Wideband Code Division Multiple Access) or cdma 2000 (Code Division Multiple Access 2000).

Note that, in the present embodiment, the ground station (also referred to as ground base station) refers to a base station (including a relay station) installed on the ground. Here, the "ground" is a ground in a broad sense including not only the land but also underground, on water, and underwater. Note that, in the following explanation, the description of "ground station" may be replaced with "gateway".

Further, the technique of the present disclosure is applicable not only to communication between the non-ground base station and the terminal device but also to communication between the ground base station and the terminal device.

A configuration of the communication system 1 is specifically explained below.

2-1. Overall Configuration of the Communication System

Figure 6:
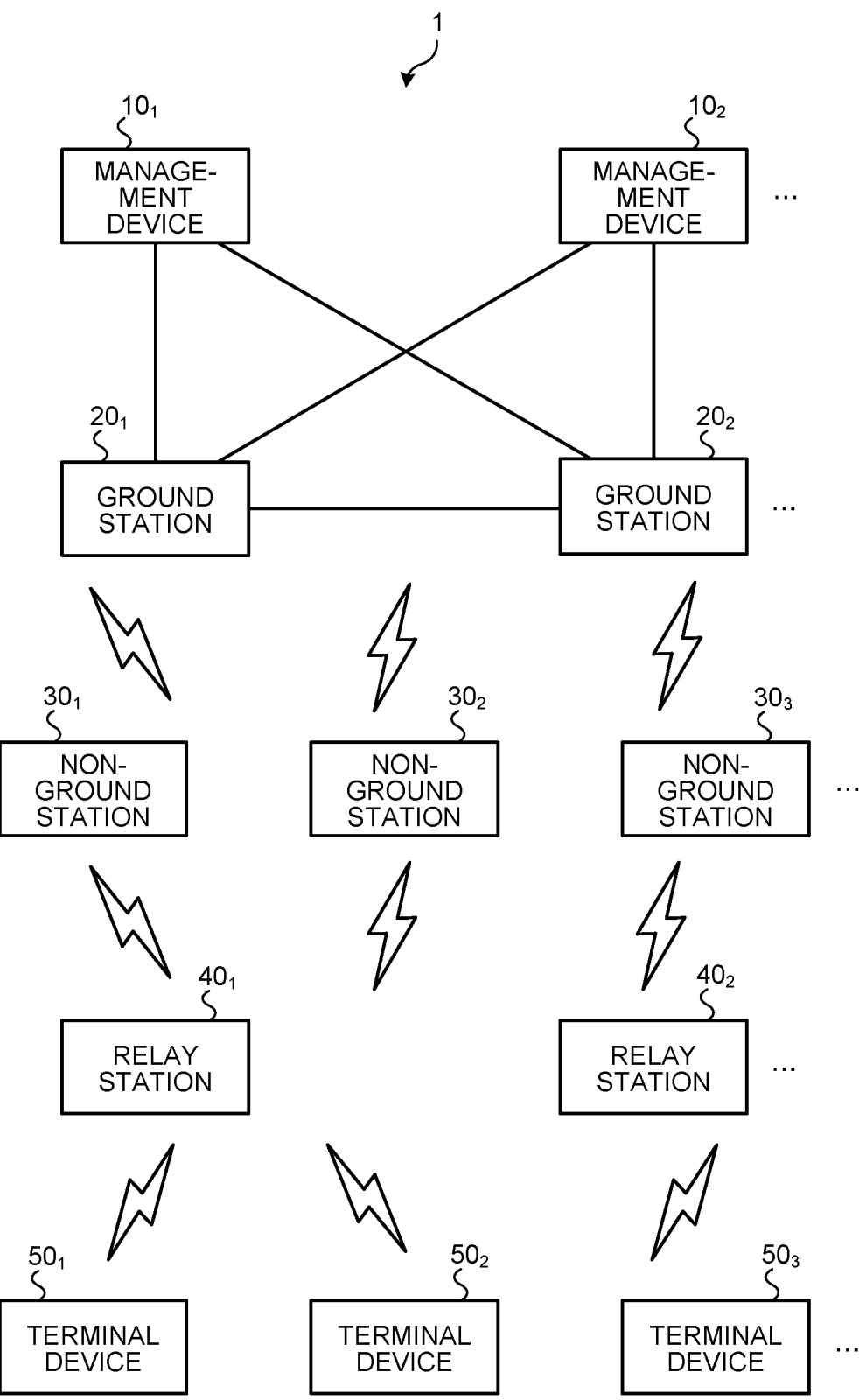
FIG. 6 is a diagram illustrating a configuration example of a communication system according to an embodiment of the present disclosure.

FIG. 6 is a diagram illustrating a configuration example of a communication system 1 according to the embodiment of the present disclosure. The communication system 1 includes a management device 10, a ground station 20, a non-ground station 30, a relay station 40, and a terminal device 50. Wireless communication devices configuring the communication system 1 operate in cooperation, whereby the communication system 1 provides a user with a wireless network capable of performing mobile communication. The wireless network in the present embodiment is configured by, for example, a radio access network and a core network. Note that, in the present embodiment, the wireless communication device means a device having a wireless communication function. In the example illustrated in FIG. 6, the ground station 20, the non-ground station 30, the relay station 40, and the terminal device 50 correspond to the wireless communication device.

The communication system 1 may include a plurality of management devices 10, a plurality of ground stations 20, a plurality of non-ground stations 30, a plurality of relay stations 40, and a plurality of terminal devices 50. In the example illustrated in FIG. 6, the communication system 1 includes management devices 101 and 102 as the management device 10. Further, the communication system 1 includes ground stations 201 and 202 as the ground station 20 and includes non-ground stations $30_1$ and $30_2$ as the non-ground station 30. Further, the communication system 1 includes relay stations $40_1$ and $40_2$ as the relay station 40 and includes terminal devices $50_1$, $50_2$, and $50_3$ as the terminal device 50.

Figure 7:
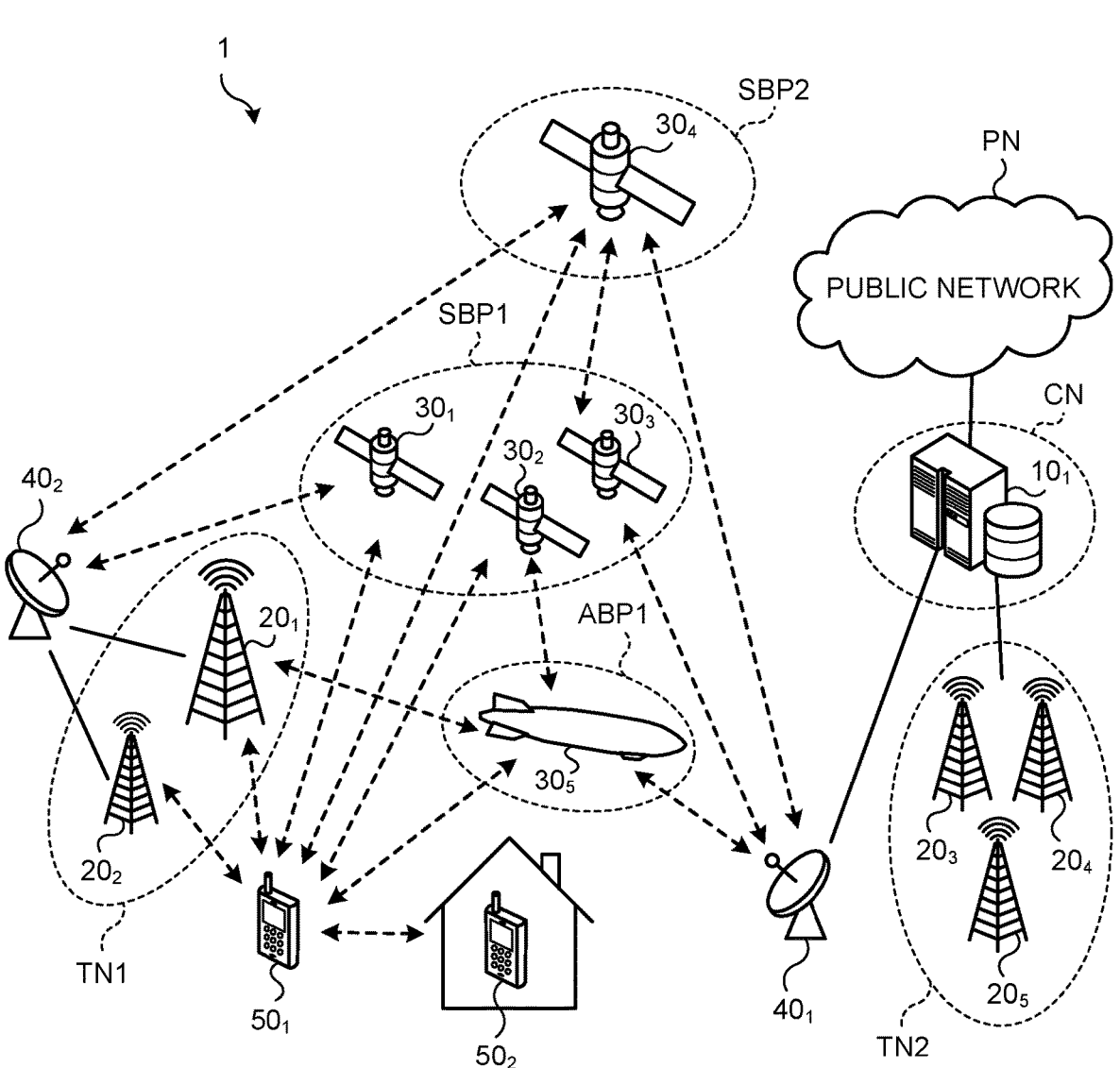
FIG. 7 is a diagram illustrating an example of a wireless network provided by the communication system.

FIG. 7 is a diagram illustrating an example of a wireless network provided by the communication system 1.

The management device 10 is, for example, a device configuring the core network CN. The management device 10 is connected to the public network PN. The management device 10 is connected to the ground station 20 and the non-ground station 30 and enables the terminal device 50 to be connected to the public network PN.

The ground station 20 and the non-ground station 30 are base stations. The ground station 20 is, for example, a ground base station installed in a structure on the ground. The non-ground station 30 is, for example, a non-ground base station such as a middle earth orbiting satellite, a low earth orbiting satellite, or an HAPS (High Altitude Platform Station). Each of the ground station 20 and the non-ground station 30 configures a cell. A cell is an area where wireless communication is covered. The cell may be any of a macro cell, a micro cell, a femto cell, and a small cell. Note that the communication system 1 may be configured to manage a plurality of cells with a single base station (satellite station) or may be configured to manage one cell with a plurality of base stations.

In the example illustrated in FIG. 7, the ground stations 201 and 202 configure a terrestrial network TN1 and the ground stations 203, 204, and 205 configure a terrestrial network TN2. The terrestrial network TN1 and the terrestrial network TN2 are, for example, networks operated by a wireless communication carrier such as a telephone company. The terrestrial network TN1 and the terrestrial network TN2 may be operated by different wireless communication carriers or may be operated by the same wireless communication carrier. The terrestrial network TN1 and the terrestrial network TN2 can be regarded as one terrestrial network.

The terrestrial network TN1 and the terrestrial network TN2 are respectively connected to core networks. In the example illustrated in FIG. 7, the ground station 20 configuring the terrestrial network TN2 is connected to the core network CN configured by the management device 101 and the like. If a radio access scheme of the terrestrial network TN2 is the LTE, the core network CN is EPC. If the radio access scheme of the terrestrial network TN2 is the NR, the core network CN is 5GC. Naturally, the core network CN is not limited to EPC or 5GC and may be a core network of another radio access scheme. In the example illustrated in FIG. 7, the terrestrial network TN1 is not connected to a core network. However, the terrestrial network TN1 may be connected to the core network CN. The terrestrial network TN1 may be connected to a not-illustrated core network different from the core network CN.

The core network CN includes a gateway device, a gate exchange, and the like and is connected to a public network PN via a gateway device. The public network PN is a public data network such as the Internet, a regional IP network, or a telephone network (a mobile telephone network, a fixed telephone network, or the like). The gateway device is a server device connected to the Internet, a regional IP network, or the like. The gate exchange is, for example, an exchange connected to a telephone network of a telephone company. The management device 101 may have a function of the gateway device or the gate exchange.

All of the non-ground stations 30 illustrated in FIG. 7 are non-ground stations such as satellite stations or aircraft stations. A satellite station group (or satellite stations) configuring a non-terrestrial network is referred to as a space-borne platform. In addition, an aircraft station group (or an aircraft station) configuring the non-terrestrial network is referred to as an airborne platform. In the example illustrated in FIG. 7, the non-ground stations $30_1$, $30_2$, and $30_3$ configure a space-borne platform SBP1 and the non-ground station $30_4$ configures a space-borne platform SBP2. The non-ground station $30_5$ configures an air-bone platform ABP1.

The non-ground stations 30 may be capable of communicating with a terrestrial network or a core network via the relay stations 40. Naturally, the non-ground stations 30 may be capable of directly communicating with the terrestrial network or the core network not via the relay stations 40. Note that the non-ground stations 30 may be capable of communicating with the terminal devices 50 via the relay stations 40 or may be capable of directly communicating with the terminal devices 50. The non-ground stations 30 may be capable of directly communicating with one another not via the relay stations 40.

The relay stations 40 relay communication between devices on the ground and the non-ground stations 30. In the example illustrated in FIG. 7, the relay station $40_1$ relays communication between the ground stations 20 and the non-ground stations 30 and the relay station $40_2$ relays communication between the management devices 10 and the non-ground stations 30. Note that the ground stations 20 may relay communication between the terminal devices 50 and the non-ground stations 30. Further, the relay stations 40 may be capable of communicating with the other relay stations 40.

The terminal devices 50 are capable of communicating with both the ground station and the non-ground station. In the example illustrated in FIG. 7, the terminal device $50_1$ is capable of communicating with the ground stations configuring the terrestrial network TN1. The terminal device $50_1$ is capable of communicating with the non-ground stations configuring the space-borne platforms SBP1 and SBP2. The terminal devices 50 are also capable of communicating with the non-ground stations configuring the air-borne platform ABP1. Note that the terminal devices 50 may be capable of communicating with the relay stations 40. The terminal devices 50 may be capable of directly communicating with the other terminal devices 50. The terminal device $50_1$ may be capable of directly communicating with the terminal device $50_2$.

Figure 8:
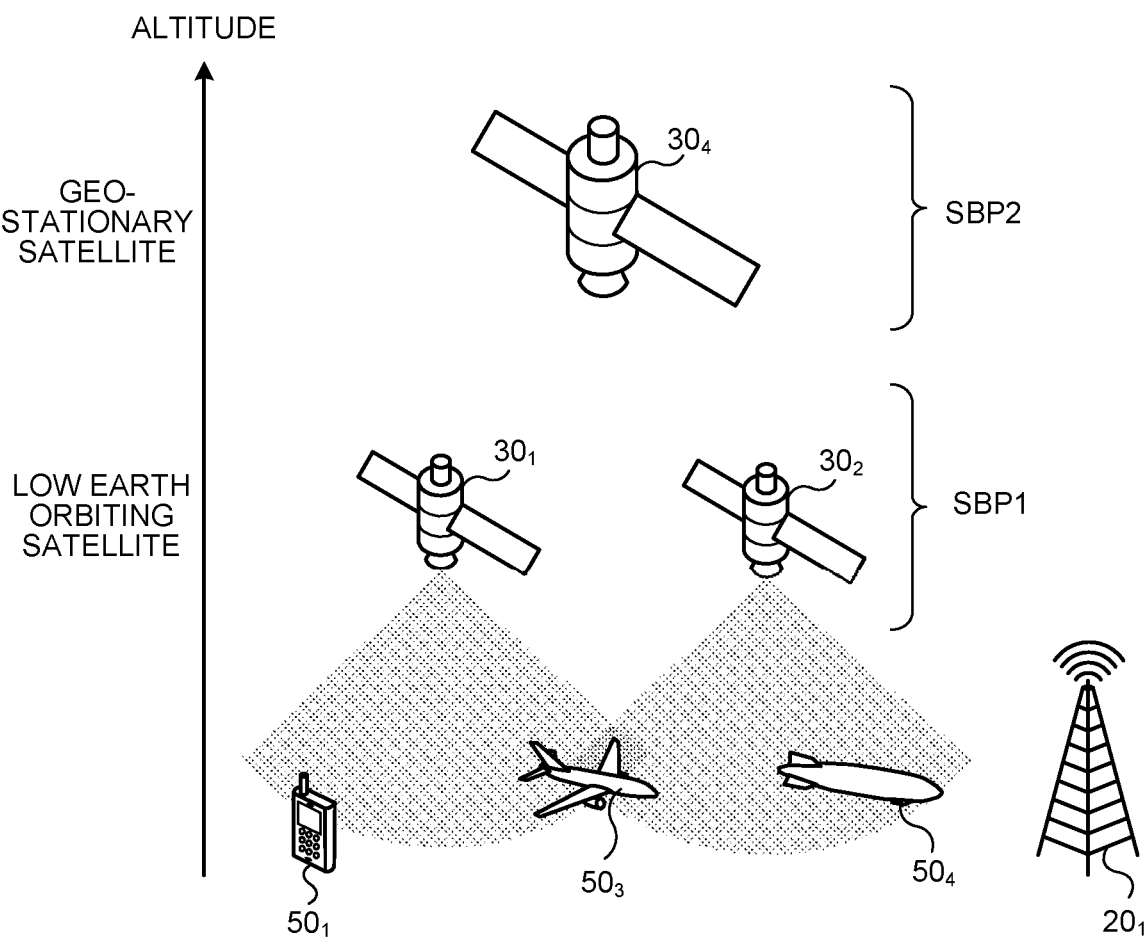
FIG. 8 is a diagram illustrating an overview of satellite communication provided by the communication system.

Devices configuring the space-borne platforms SBP1 and SBP2 perform satellite communication with the terminal devices 50. Satellite communication means wireless communication between a satellite station and a communication device. FIG. 8 is a diagram illustrating an overview of satellite communication provided by the communication system 1. The satellite station is mainly divided into a geostationary satellite station and a low earth orbiting satellite station.

The geostationary satellite station is located at an altitude of approximately 35786 km and revolves the earth at the same speed as the rotation speed of the earth. In an example illustrated in FIG. 8, the non-ground station 30₄ configuring the space-borne platform SBP2 is a geostationary satellite station. Relative velocity of the geostationary satellite station to the terminal device 50 on the ground is substantially 0. The geostationary satellite station is observed from the terminal device 50 on the ground as if the geostationary satellite station is standing still. The non-ground station 30₄ performs satellite communication with the terminal devices 50₁, 50₃, 50₄, and the like located on the earth.

The low earth orbiting satellite station is a satellite station that orbits at lower altitude than the geostationary satellite station or a middle earth orbiting satellite station. The low earth orbiting satellite station is, for example, a satellite station located at altitude of 500 km to 2000 km. In the example illustrated in FIG. 8, the non-ground stations 30₁ and 30₂ configuring the space-borne platform SBP1 are low earth orbiting satellite stations. Note that, in FIG. 8, only two non-ground stations 30₁ and 30₂ are illustrated as satellite stations configuring the space-borne platform SBP1. However, actually, for the satellite stations configuring the space-borne platform SBP1, a low earth orbiting satellite constellation is formed by three or more (for example, several tens to several thousands) non-ground stations 30. Unlike the geostationary satellite station, the low earth orbiting satellite station has relative velocity to the terminal devices 50 on the ground and is observed from the terminal devices 50 on the ground as if the low earth orbiting satellite station is moving. The non-ground stations 30₁ and 30₂ respectively configure cells and perform satellite communication with the terminal devices 50₁, 50₃, 50₄, and the like located on the earth.

Figure 9:
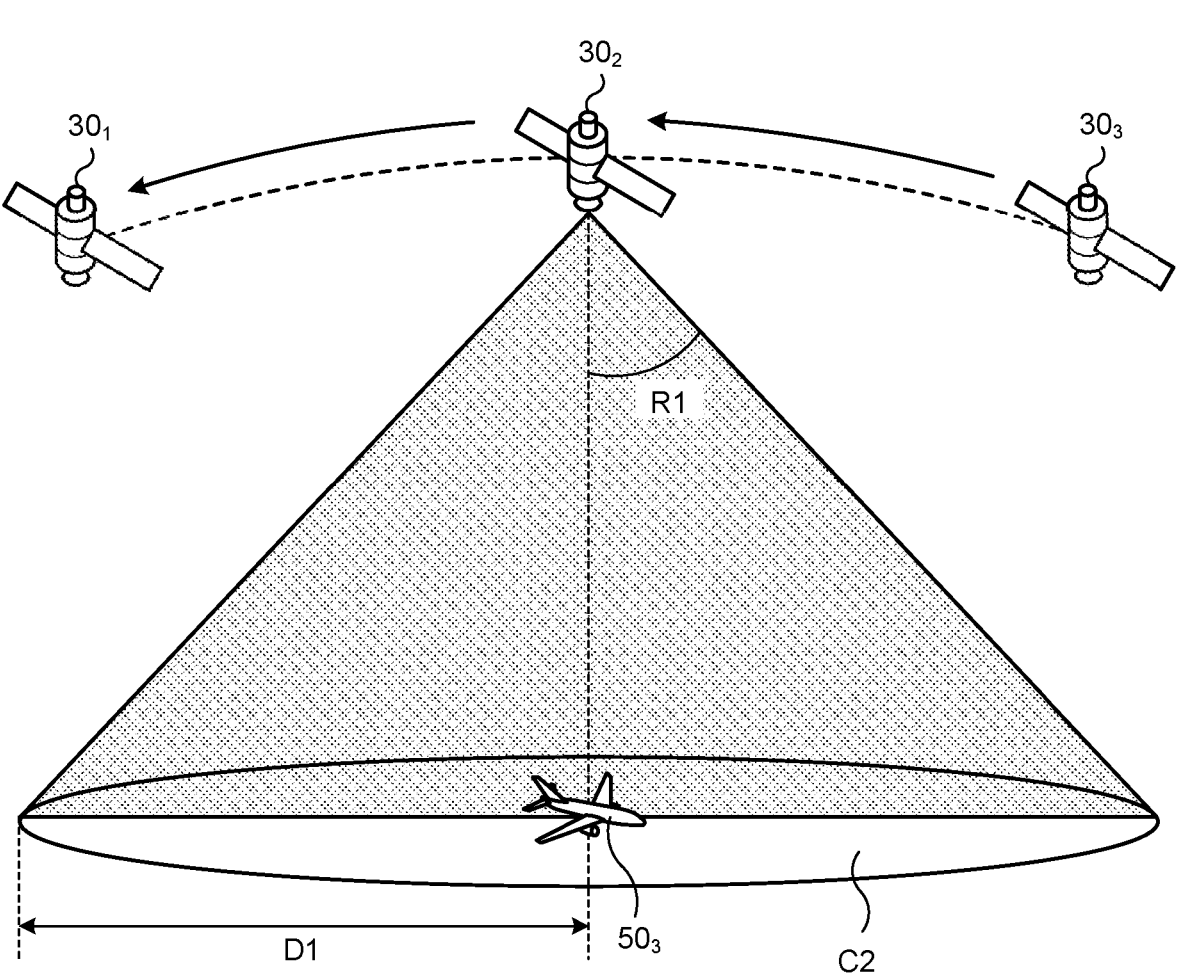
FIG. 9 is a diagram illustrating an example of a cell configured by a non-geostationary satellite.

FIG. 9 is a diagram illustrating an example of a cell configured by a non-geostationary satellite. FIG. 9 illustrates a cell C2 formed by the non-ground station 30₂, which is a low earth orbiting satellite station. A satellite station orbiting in a low orbit communicates with the terminal device 50 on the ground with predetermined directivity on the ground. For example, an angle R1 illustrated in FIG. 9 is 40°. In the case of FIG. 9, a radius D1 of the cell C2 formed by the non-ground station 30₂ is, for example, 1000 km. The low earth orbiting satellite station moves with constant velocity. When it becomes difficult for the low earth orbiting satellite station to provide satellite communication to the terminal device 50 on the ground, the following low earth orbiting satellite station (a neighbor satellite station) provides satellite communication. In the example illustrated in FIG. 9, when it becomes difficult for the non-ground station 30₂ to provide satellite communication to the terminal device 50 on the ground, the following non-ground station 30₃ provides satellite communication. Note that the values of the angle R1 and the radius D1 described above are merely examples and are not limited to the above.

As explained above, the middle earth orbiting satellite and the low earth orbiting satellite are moving on orbits at extremely high speed in the sky and, for example, a low earth orbiting satellite present at altitude of 600 km is moving on an orbit at speed of 7.6 km/S. The low earth orbiting satellite forms a cell (or a beam) having a radius of several ten km to several hundred km on the ground. However, since the cell formed on the ground also moves according to the movement of the satellite, handover is sometimes necessary even if the terminal device on the ground is not moving. For example, when a case is assumed in which a cell diameter formed on the ground is 50 km and the terminal device on the ground is not moving, handover occurs in approximately 6 to 7 seconds.

As explained above, the terminal device 50 is capable of performing wireless communication using the non-terrestrial network. The non-ground station 30 of the communication system 1 configures the non-terrestrial network. Consequently, the communication system 1 becomes capable of extending a service to the terminal device 50 located in an area that cannot be covered by the terrestrial network. For example, the communication system 1 becomes capable of providing public safety communication and critical communication to a communication device such as an IoT (Internet of Things) device or an MTC (Machine Type Communications) device. Since the use of the non-terrestrial network improves service reliability and recoverability, the communication system 1 becomes capable of reducing vulnerability of a service against physical attacks or natural disasters. The communication system 1 can realize service connection to airplane passengers and aircraft terminal devices such as drones and service connection to mobile terminal devices such as ships and trains. Besides, the communication system 1 can realize provision of A/V content, group communication, an IoT broadcast service, a software download service, a high-efficiency multicast service such as an emergency message, a high-efficiency broadcast service, and the like. Further, the communication system 1 can also realize traffic offloading between a terrestrial network and a non-terrestrial network. In order to realize these, it is desirable that the non-terrestrial network provided by the communication system 1 is subjected to operation integration in an upper layer with the terrestrial network provided by the communication system 1. The non-terrestrial network provided by the communication system 1 desirably has a radio access scheme common to that of the terrestrial network provided by the communication system 1.

Note that the devices in the drawings may be considered devices in a logical sense. That is, a part of the devices in the drawings may be realized by a virtual machine (VM), a container (Container), a docker (Docker), and the like and may be implemented on physically the same hardware.

In the present embodiment, the ground station and the non-ground station can be rephrased as base stations. The satellite station can be replaced as relay station. If the satellite station has a function of a base station, the satellite station can be replaced as base station.

Note that an LTE base station is sometimes referred to as eNodeB (Evolved Node B) or eNB. An NR base station is sometimes referred to as gNodeB or gNB. In the LTE and the NR, the terminal device (also referred to as mobile station or terminal) is sometimes referred to as UE (User Equipment). Note that the terminal device is a type of a communication device and is also referred to as mobile station or terminal.

In the present embodiment, the concept of the communication device includes not only a portable mobile device (the terminal device) such as a mobile terminal but also a device installed in a structure or a mobile body. The structure or the mobile body itself may be regarded as the communication device. The concept of the communication device includes not only the terminal device but also a base station and a relay station. The communication device is a type of a processing device and an information processing device. The communication device can be replaced as transmission device or reception device.

In the following explanation, configurations of the devices configuring the communication system 1 are specifically explained. Note that the configurations of the devices explained below are merely an example. The configurations of the devices may be different from the configurations explained below.

2-2. Configuration of the Management Device

Subsequently, a configuration of the management device 10 is explained.

The management device 10 is a device that manages a wireless network. For example, the management device 10 is a device configuring a core network. If a core network is an EPC, the management device 10 is, for example, a device having a function of an MME (Mobility Management Entity). If the core network is 5 GC, the management device 10 is, for example, a device having a function of an AMF (Access and Mobility Management Function) and/or an SMF (Session Management Function). Naturally, the functions of the management device 10 are not limited to the MME, the AMF, and the SMF. For example, if the core network is 5GC, the management device 10 may be a device having a function of an NSSF (Network Slice Selection Function), an AUSF (Authentication Server Function), a PCF (Policy Control Function), or a UDM (Unified Data Management). The management device 10 may be a device having a function of an HSS (Home Subscriber Server).

Note that the management device 10 may have a function of a gateway. For example, if the core network is an EPC, the management device 10 may have a function of an SGW (Serving Gateway) or a P-GW (Packet Data Network Gateway). If the core network is 5 GC, the management device 10 may have a function of a UPF (User Plane Function). Note that the management device 10 may not always be a device configuring the core network. For example, it is assumed that the core network is a core network of W-CDMA (Wideband Code Division Multiple Access) or cdma2000 (Code Division Multiple Access 2000). At this time, the management device 10 may be a device that functions as an RNC (Radio Network Controller).

Figure 10:
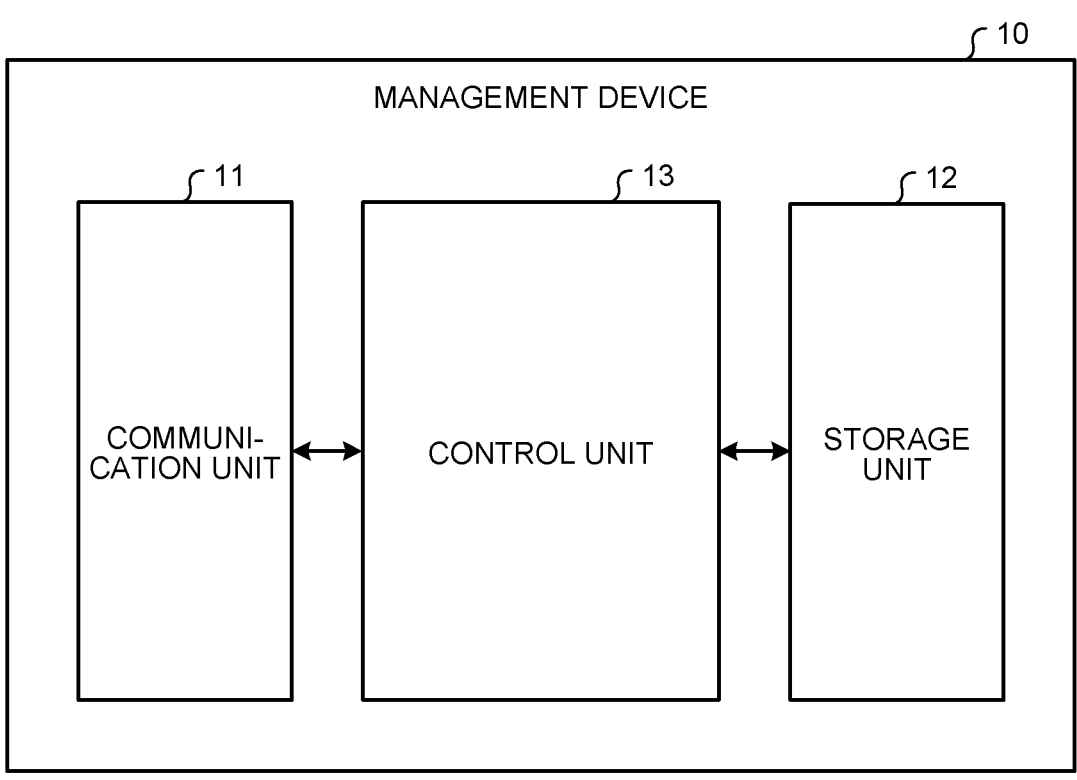
FIG. 10 is a diagram illustrating a configuration example of a management device according to the embodiment of the present disclosure.

FIG. 10 is a diagram illustrating a configuration example of the management device 10 according to the embodiment of the present disclosure. The management device 10 includes a communication unit 11, a storage unit 12, and a control unit 13. Note that the configuration illustrated in FIG. 10 is a functional configuration. A hardware configuration may be different from this configuration. The functions of the management device 10 may be implemented in a distributed manner in a plurality of physically separated components. For example, the management device 10 may configured by a plurality of server devices.

The communication unit 11 is a communication interface for communicating with other devices. The communication unit 11 may be a network interface or may be a device connection interface. For example, the communication unit 11 may be a LAN (Local Area Network) interface such as an NIC (Network Interface Card) or may be a USB interface configured by a USB (Universal Serial Bus) host controller, a USB port, and the like. The communication unit 11 may be a wired interface or a wireless interface. The communication unit 11 functions as communication means of the management device 10. The communication unit 11 communicates with the ground station 20 and the like according to control of the control unit 13.

The storage unit 12 is a data readable/writable storage device such as a DRAM (Dynamic Random Access Memory), an SRAM (Static Random Access Memory), a flash memory, or a hard disk. The storage unit 12 functions as storage means of the management device 10. The storage unit 12 stores, for example, a connection state of the terminal device 50. For example, the storage unit 12 stores an RRC state and an ECM state of the terminal device 50. The storage unit 12 may function as a home memory that stores position information of the terminal device 50.

The control unit 13 is a controller that controls the units of the management device 10. The control unit 13 is realized by a processor such as a CPU (Central Processing Unit), an MPU (Micro Processing Unit), or a GPU (Graphics Processing Unit). For example, the control unit 13 is realized by the processor executing various programs stored in a storage device inside the management device 10 using a RAM (Random Access Memory) or the like as a work area. Note that the control unit 13 may be realized by an integrated circuit such as an ASIC (Application Specific Integrated Circuit) or an FPGA (Field Programmable Gate Array). All of the CPU, the MPU, the GPU, the ASIC, and the FPGA can be regarded as the controller.

2-3. Configuration of the Ground Station

Subsequently, a configuration of the ground station 20 is explained.

The ground station 20 is a wireless communication device that wirelessly communicates with the terminal device 50. The ground station 20 may be configured to wirelessly communicate with the terminal device 50 via the non-ground station 30 or may be configured to wirelessly communicate with the terminal device 50 via a relay station on the ground. Naturally, the ground station 20 may be configured to directly wirelessly communicate with the terminal device 50.

The ground station 20 is a type of a communication device. More specifically, the ground station 20 is a device equivalent to a radio base station (Base Station, Node B, eNB, gNB, or the like) or a wireless access point. The ground station 20 may be a wireless relay station. Further, the ground station 20 may be an optical extension device called RRH (Remote Radio Head) or RU (Radio Unit). The ground station 20 may be a receiving station such as an FPU (Field Pickup Unit). The ground station 20 may be an IAB (Integrated Access and Backhaul) donor node or an IAB relay node that provides a radio access line and a radio backhaul line by time division multiplexing, frequency division multiplexing, or space division multiplexing.

Note that a radio access technology used by the ground station 20 may be a cellular communication technology or a wireless LAN technology. Naturally, the radio access technology used by the ground station 20 is not limited the above and may be another radio access technology. For example, the radio access technology used by the ground station 20 may be an LPWA communication technology. Naturally, wireless communication used by the ground station 20 may be wireless communication using millimeter waves. The wireless communication used by the ground station 20 may be wireless communication using radio waves or wireless communication (optical wireless) using infrared rays or visible light.

The ground station 20 may be capable of performing NOMA (Non-Orthogonal Multiple Access) communication with the terminal device 50. Here, the NOMA communication is communication using a non-orthogonal resource (transmission, reception, or both of transmission and reception). Note that the ground station 20 may be capable of performing the NOMA communication with another ground station 20. Here, the non-orthogonal resource is a resource of an axis different from the orthogonal resource (a time, a frequency, and a space) and is a radio resource capable of separating different signals using scrambling, interleaving, a code (for example, a spreading code or a sparse code), a power difference, and the like.

Note that the ground stations 20 may be capable of communicating with each other via a base station-core network interface (for example, S1 Interface). This interface may be either wired or wireless. The base stations may be capable of communicating with each other via an inter-base station interface (for example, X2 Interface or S1 Interface). This interface may be either wired or wireless.

Note that the concept of the base station (also referred to as base station device) includes not only a donor base station but also a relay base station (also referred to as relay station or relay station). The concept of the base station includes not only a structure having a function of the base station but also a device installed in the structure.

The structure is a building such as a high-rise building, a house, a steel tower, a station facility, an airport facility, a harbor facility, an office building, a school building, a hospital, a factory, a commercial facility, or a stadium. Note that the concept of the structure includes not only a building but also a structure (a non-building structure) such as a tunnel, a bridge, a dam, a wall, or an iron pillar and equipment such as a crane, a gate, or a windmill. The concept of the structure includes not only a structure on the land (the ground in a narrow sense) or in the ground but also a structure on water such as a platform or a mega-float, and a structure under water such as a marine observation facility. The base station may be replaced as information processing device.

The ground station 20 may be a donor station or a relay station (a relay station). The ground station 20 may be a stationary station or a mobile station. The mobile station is a wireless communication device (for example, a base station) configured to be movable. At this time, the ground station 20 may be a device installed in a mobile body or may be the mobile body itself. For example, a relay station having mobility can be regarded as the ground station 20 functioning as a mobile station. In addition, a device originally having mobility such as a vehicle, a drone, or a smartphone and loaded with a function of a base station (at least a part of the function of the base station) also corresponds to the ground station 20 functioning as the mobile station.

Here, the mobile body may be a mobile terminal such as a smartphone or a mobile phone. The mobile body may be a mobile body (for example, a vehicle such as an automobile, a bicycle, a bus, a truck, a motorcycle, a train, or a linear motor car) that moves on the land (the ground in a narrow sense) or a mobile body (for example, a subway) that moves in the ground (for example, in a tunnel).

In addition, the mobile body may be a mobile body (for example, a ship such as a passenger ship, a cargo ship, or a hovercraft) that moves on water or a mobile body (for example, a submersible such as a submersible ship, submarine, or an unmanned submersible) that moves under water.

Note that the mobile body may be a mobile body (for example, an aircraft such as an airplane, an airship, or a drone) that moves in the atmosphere.

The ground station 20 may be a ground base station (a ground station) installed on the ground. For example, the ground station 20 may be a base station arranged in a structure on the ground or may be a base station installed in a mobile body moving on the ground. More specifically, the ground station 20 may be an antenna installed in a structure such as a building and a signal processing device connected to the antenna. Naturally, the ground station 20 may be the structure or the mobile body itself. The "ground" is a ground in a broad sense including not only on the land (on the ground in a narrow sense) but also on the ground, on water, and under water. Note that the ground station 20 is not limited to a ground base station. For example, when the communication system 1 is a satellite communication system, the ground station 20 may be an aircraft station. From the perspective of a satellite station, an aircraft station located on the earth is a ground station.

The size of the coverage of the ground station 20 may be a large size such the size of as a macro cell or a small cell such as a picocell. Naturally, the size of the coverage of the ground station 20 may be an extremely small size such as the size of a femtocell. The ground station 20 may have a beamforming capability. In this case, the ground station 20 may form a cell or a service area for each beam. For that purpose, the ground station 20 may be equipped with an antenna array configured from a plurality of antenna elements and may be configured to provide an advanced antenna technology represented by MIMO (Multiple Input Multiple Output) and beamforming.

Figure 11:
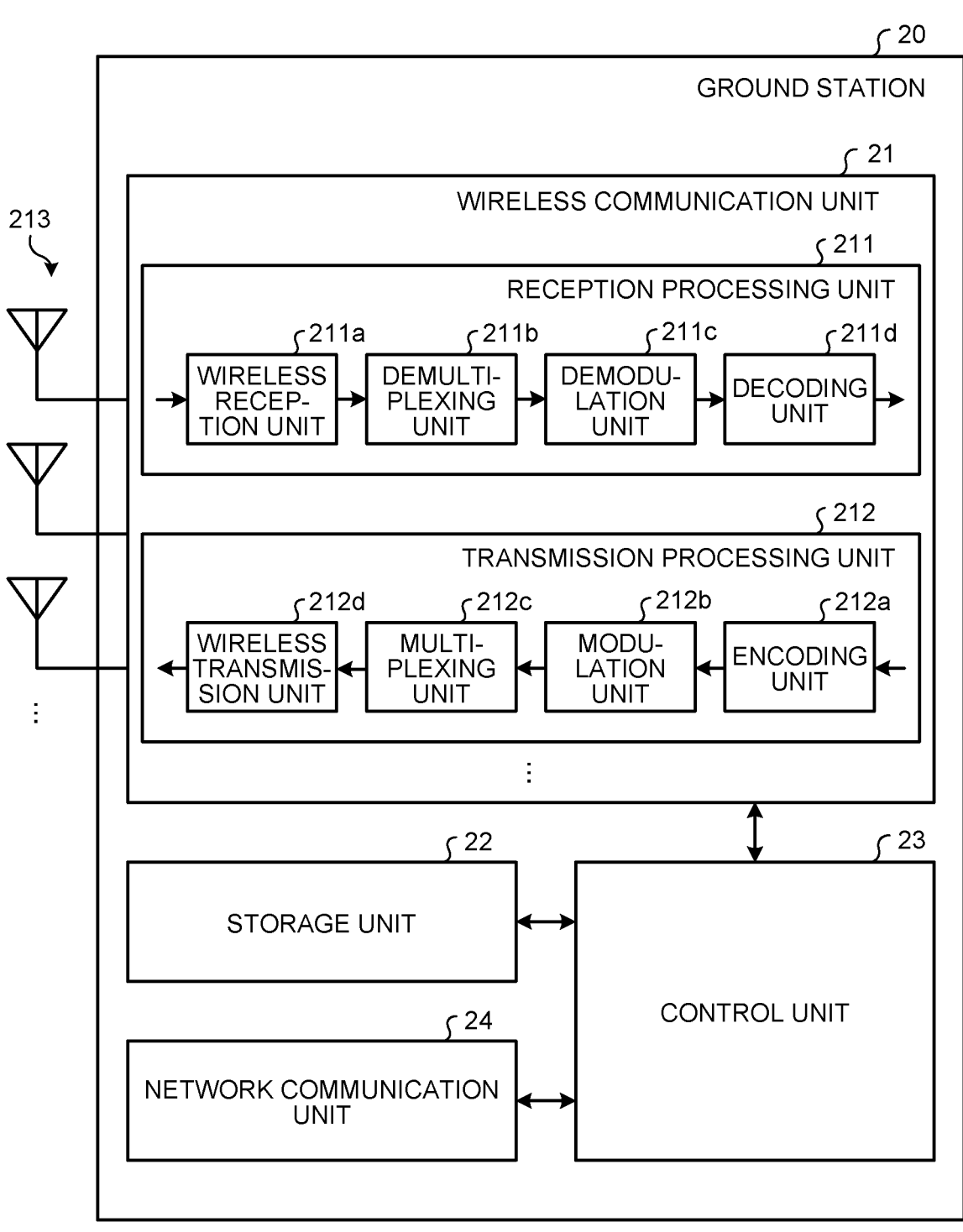
FIG. 11 is a diagram illustrating a configuration example of a ground station according to the embodiment of the present disclosure.

FIG. 11 is a diagram illustrating a configuration example of the ground station 20 according to the embodiment of the present disclosure. The ground station 20 includes a wireless communication unit 21, a storage unit 22, a control unit 23, and a network communication unit 24. Note that the configuration illustrated in FIG. 11 is a functional configuration. A hardware configuration may be different from this configuration. The functions of the ground station 20 may be implemented in a distributed manner in a plurality of physically separated components.

The wireless communication unit 21 is a signal processing unit for wirelessly communicating with other wireless communication devices (for example, the non-ground stations 30, the relay stations 40, the terminal devices 50, and the other ground stations 20). The wireless communication unit 21 operates under the control of the control unit 23. The wireless communication unit 21 is adapted to one or a plurality of radio access schemes. For example, the wireless communication unit 21 is adapted to both of the NR and the LTE. The wireless communication unit 21 may be adapted to W-CDMA or cdma 2000 in addition to the NR or the LTE. The wireless communication unit 21 may be adapted to an automatic retransmission technology such as HARQ (Hybrid Automatic Repeat Request).

The wireless communication unit 21 includes a reception processing unit 211, a transmission processing unit 212, and an antenna 213. The wireless communication unit 21 may include a plurality of reception processing units 211, a plurality of transmission processing units 212, and a plurality of antennas 213. Note that, when the wireless communication unit 21 is adapted to a plurality of radio access schemes, the units of the wireless communication unit 21 can be configured individually for each of the radio access schemes. For example, the reception processing unit 211 and the transmission processing unit 212 may be individually configured by the LTE and the NR. The antenna 213 may be configured by a plurality of antenna elements (for example, a plurality of patch antennas). In this case, the wireless communication unit 21 may be configured to be capable of performing beamforming. The wireless communication unit 21 may be configured to be capable of performing polarization beamforming using vertically polarized waves (V-polarized waves) and horizontally polarized waves (H-polarized waves).

The reception processing unit 211 processes an uplink signal received via the antenna 213. For example, the reception processing unit 211 performs, on the uplink signal, down-conversion, removal of an unnecessary frequency component, control of an amplification level, quadrature demodulation, conversion to a digital signal, removal of a guard interval (cyclic prefix), extraction of a frequency domain signal by fast Fourier transform, and the like. Then, the reception processing unit 211 separates an uplink channel such as a PUSCH (Physical Uplink Shared Channel) and a PUCCH (Physical Uplink Control Channel) and an uplink reference signal from the signals subjected to these kinds of processing. The reception processing unit 211 demodulates the received signal using a modulation scheme such as BPSK (Binary Phase Shift Keying) or QPSK (Quadrature Phase Shift Keying) for a modulation symbol of the uplink channel. The modulation scheme used for the demodulation may be 16QAM (Quadrature Amplitude Modulation), 64QAM, 256QAM, or 1024QAM. In this case, signal points on a constellation do not always need to be equidistant. The constellation may be a non uniform constellation (NUC). The reception processing unit 211 performs decoding processing on a demodulated encoded bits of the uplink channel. Decoded uplink data and uplink control information are output to the control unit 23.

The transmission processing unit 212 performs transmission processing for downlink control information and downlink data. For example, the transmission processing unit 212 encodes the downlink control information and the downlink data input from the control unit 23 using an encoding scheme such as block encoding, convolutional encoding, turbo encoding, or the like. Then, the transmission processing unit 212 modulates the coded bits with a predetermined modulation scheme such as BPSK, QPSK, 16QAM, 64QAM, 256QAM, or 1024QAM. In this case, signal points on a constellation do not always need to be equidistant. The constellation may be a non-uniform constellation (NUC). Then, the transmission processing unit 212 multiplexes modulation symbols and downlink reference signals of channels and arranges the multiplexed symbols the downlink reference signals in a predetermined resource element. Then, the transmission processing unit 212 performs various kinds of signal processing on the multiplexed signals. For example, the transmission processing unit 212 performs processing such as conversion into a time domain by fast Fourier transform, addition of a guard interval (a cyclic prefix), generation of a baseband digital signal, conversion into an analog signal, quadrature modulation, up-conversion, removal of an extra frequency component, and amplification of power. A signal generated by the transmission processing unit 212 is transmitted from the antenna 213.

The antenna 213 is an antenna device (an antenna unit) that mutually converts a current and a radio wave. The antenna 213 may be configured by one antenna element (for example, one patch antenna) or may be configured by a plurality of antenna elements (for example, a plurality of patch antennas). When the antenna 213 is configured by a plurality of antenna elements, the wireless communication unit 21 may be configured to be capable of performing beamforming. For example, the wireless communication unit 21 may be configured to generate a directional beam by controlling the directivity of a radio signal using the plurality of antenna elements. Note that the antenna 213 may be a dual-polarized antenna. When the antenna 213 is a dual-polarized antenna, the wireless communication unit 21 may use vertically polarized waves (V-polarized waves) and horizontally polarized waves (H-polarized waves) in transmitting radio signals. Then, the wireless communication unit 21 may control the directivity of the radio signal transmitted using the vertically polarized wave and the horizontally polarized wave. The wireless communication unit 21 may transmit and receive spatially multiplexed signals via a plurality of layers configured by a plurality of antenna elements.

The storage unit 22 is a data readable/writable storage device such as a DRAM, an SRAM, a flash memory, or a hard disk. The storage unit 22 functions as storage means of the ground station 20.

The control unit 23 is a controller that controls the units of the ground station 20. The control unit 23 is realized by a processor such as a CPU, an MPU, or a GPU. For example, the control unit 23 is realized by the processor executing various programs stored in a storage device inside the ground station 20 using a RAM or the like as a work area. Note that the control unit 23 may be realized by an integrated circuit such as an ASIC or an FPGA. All of the CPU, the MPU, the GPU, the ASIC, and the FPGA can be regarded as the controller.

Note that an operation of the control unit 23 of the ground station 20 may be the same as an operation of the control unit 33 of the non-ground station 30. Conversely, the operation of the control unit 33 of the non-ground station 30 may be the same as the operation of the control unit 23 of the ground station 20.

The network communication unit 24 is a communication interface for communicating with other devices. The network communication unit 24 is, for example, a network interface. For example, the network communication unit 24 is a LAN interface such as an NIC. Note that the network communication unit 24 may be a wired interface or may be a wireless interface. The network communication unit 24 functions as communication means of the relay station 40. The network communication unit 24 communicates with the management device 10, the relay station 40, and the like under the control of the control unit 23.

2-4. Configuration of the Non-Ground Station

Subsequently, a configuration of the non-ground station 30 is explained.

The non-ground station 30 is a base station that provides the terminal device 50 with a function of a base station. Alternatively, the non-ground station 30 is a relay station that relays communication between the ground station 20 and the terminal device 50. The non-ground station 30 may be a satellite station or an aircraft station.

The satellite station is a satellite station capable of floating outside the atmosphere. The satellite station may be a device loaded on a space mobile body such as an artificial satellite or may be the space mobile body itself. The space mobile body is a mobile body that moves outside the atmosphere. Examples of the space mobile body include artificial celestial bodies such as an artificial satellite, a spacecraft, a space station, and a probe.

Note that a satellite serving as the satellite station may be any of a low earth orbiting (LEO) satellite, a medium earth orbiting (MEO) satellite, a geostationary earth orbiting (GEO) satellite, and a highly elliptical orbiting (HEO) satellite. Naturally, the satellite station may be a device loaded on the low earth orbiting satellite, the middle earth orbiting satellite, the geostationary earth orbiting satellite, or the high elliptical orbiting satellite.

The aircraft station is a wireless communication device capable of floating in the atmosphere such as an aircraft. The aircraft station may be a device loaded on an aircraft or the like or may be the aircraft itself. Note that the concept of the aircraft includes not only a heavy aircraft such as an airplane and a glider but also a light aircraft such as a balloon and an airship. The concept of the aircraft includes not only the heavy aircraft and the light aircraft but also a rotorcraft such as a helicopter and an auto-gyroscope. Note that the aircraft station (or an aircraft on which the aircraft station is loaded) may be an unmanned aircraft such as a drone.

Note that the concept of the unmanned aircraft also includes an unmanned aircraft system (UAS) and a tethered UAS. The concept of the unmanned aircraft includes a Lighter than Air UAS (LTA) and a Heavier than Air UAS (HTA). Besides, the concept of the unmanned aircraft also includes High Altitude UAS Platforms (HAPs).

Figure 12:
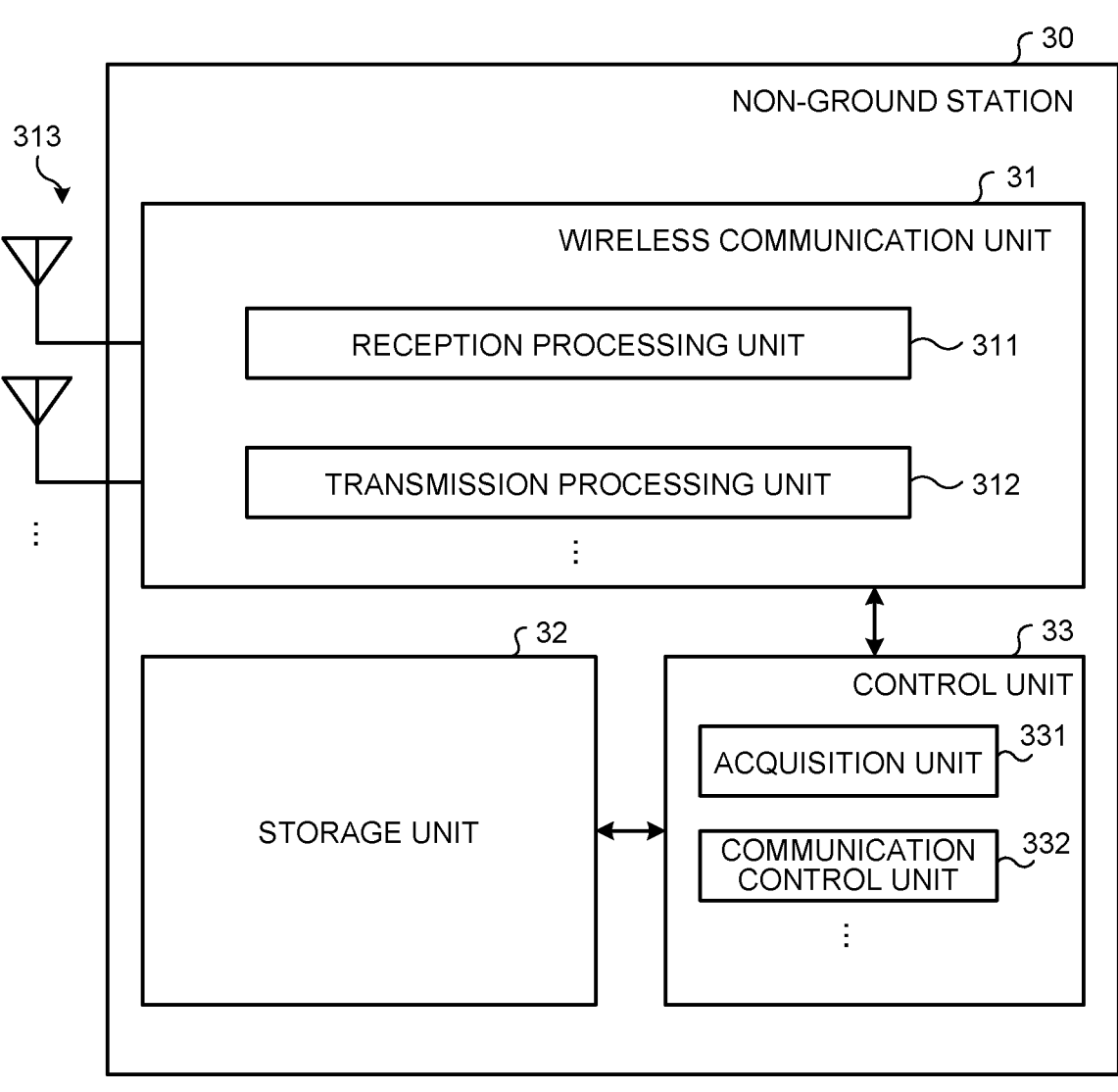
FIG. 12 is a diagram illustrating a configuration example of a non-ground station according to the embodiment of the present disclosure.

FIG. 12 is a diagram illustrating a configuration example of the non-ground station 30 according to the embodiment of the present disclosure. The non-ground station 30 includes a wireless communication unit 31, a storage unit 32, and a control unit 33. Note that the configuration illustrated in FIG. 12 is a functional configuration. A hardware configuration may be different from this configuration. The functions of the non-ground station 30 may be implemented in a distributed manner in a plurality of physically separated components.

The wireless communication unit 31 is a wireless communication interface that wirelessly communicates with other wireless communication devices (for example, the ground stations 20, the relay stations 40, the terminal devices 50, and the other non-ground stations 30). The wireless communication unit 31 is adapted to one or a plurality of radio access schemes. For example, the wireless communication unit 31 is adapted to both of the NR and the LTE. The wireless communication unit 31 may be adapted to W-CDMA or cdma 3000 in addition to the NR or the LTE. The wireless communication unit 31 includes a reception processing unit 311, a transmission processing unit 312, and an antenna 313. The wireless communication unit 31 may include a plurality of reception processing units 311, a plurality of transmission processing units 312, and a plurality of antennas 313. Note that, when the wireless communication unit 31 is adapted to a plurality of radio access schemes, the units of the wireless communication unit 31 can be configured individually for each the radio access schemes. For example, the reception processing unit 311 and the transmission processing unit 312 may be individually configured by the LTE and the NR. The configurations of the reception processing unit 311, the transmission processing unit 312, and the antenna 313 are the same as the configurations of the reception processing unit 311, the transmission processing unit 312, and the antenna 313 explained above. Note that the wireless communication unit 31 may be configured to be capable of performing beamforming like the wireless communication unit 21. Like the wireless communication unit 21, the wireless communication unit 31 may be configured to be capable of transmitting and receiving spatially multiplexed signals.

The storage unit 32 is a storage device capable of reading and writing data such as a DRAM, an SRAM, a flash memory, or a hard disk. The storage unit 32 functions as storage means of the non-ground station 30.

The control unit 33 is a controller that controls the units of the non-ground station 30. The control unit 33 is realized by a processor such as a CPU, an MPU, or a GPU. For example, the control unit 33 is realized by the processor executing various programs stored in a storage device inside the non-ground station 30 using a RAM or the like as a work area. Note that the control unit 33 may be realized by an integrated circuit such as an ASIC or an FPGA. All of the CPU, the MPU, the GPU, the ASIC, and the FPGA can be regarded as the controller.

The control unit 33 includes an acquisition unit 331 and a communication control unit 332. Blocks (the acquisition unit 331 to the communication control unit 332) configuring the control unit 33 are functional blocks indicating functions of the control unit 33. These functional blocks may be software blocks or may be hardware blocks. For example, each of the functional blocks explained above may be one software module realized by software (including micro programs) or may be one circuit block on a semiconductor chip (die). Naturally, each of the functional blocks may be one processor or one integrated circuit. The control unit 33 may be configured by functional units different from the functional blocks. A configuration method for the functional blocks is optional. Operations of the functional blocks are explained below.

2-5. Base Station

As explained above, at least one of the ground stations 20 and the non-ground stations 30 may operate as a base station. The base station is explained below.

In several embodiments, the concept of the base station may consist of a set of a plurality of physical or logical devices. For example, in the embodiment of the present disclosure, the base station may be distinguished into a plurality of devices of a BBU (Baseband Unit) and an RU (Radio Unit) and interpreted as an assembly of the plurality of devices. Further or instead of this, in the embodiment of the present disclosure, the base station may be one or both of the BBU and the RU.

The BBU and the RU may be connected by a predetermined interface (for example, eCPRI). Further or instead of this, the RU may be referred to as RRU (Remote Radio Unit) or RD (Radio DoT). Further or instead of this, the RU may correspond to a gNB-DU (gNB Distributed Unit) explained below. Further or instead of this, the BBU may correspond to a gNB-CU (gNB Central Unit) explained below. Further or instead of this, the RU may be a wireless device connected to a gNB-DU explained below. The gNB-CU, the gNB-DU, and the RU connected to the gNB-DU may be configured to conform to an O-RAN (Open Radio Access Network). Further or instead of this, the RU may be a device formed integrally with an antenna.

An antenna (for example, an antenna formed integrally with the RU) included in the base station may adopt an advanced antenna system and support MIMO (for example, FD-MIMO) or beamforming. The antenna device in this case may be a layer 1 (Physical layer) and the advanced antenna system (the antenna (for example, the antenna integrally formed with the RU) included in the base station) may include, for example, 64 transmission antenna ports and 64 reception antenna ports.

The antenna loaded in the RU may be an antenna panel configured from one or more antenna elements. The RU may be loaded with one or more antenna panels. For example, the RU may be loaded with two types of antenna panels including a horizontally polarized antenna panel and a vertically polarized antenna panel or two antenna panels including a clockwise circularly polarized antenna panel and a counterclockwise circularly polarized antenna panel. The RU may form and control an independent beam for each of the antenna panels.

Note that a plurality of base stations may be connected to one another. One or a plurality of base stations may be included in a radio access network (RAN). That is, the base station may be simply referred to as a RAN, a RAN node, an AN (Access Network), or an AN node. The RAN in the LTE is called EUTRAN (Enhanced Universal Terrestrial RAN). The RAN in the NR is referred to as NGRAN. The RAN in W-CDMA (UMTS) is referred to as UTRAN.

An LTE base station is sometimes referred to as eNodeB (Evolved Node B) or eNB. That is, the EUTRAN includes one or a plurality of eNodeBs (eNBs). An NR base station is sometimes referred to as gNodeB or gNB. That is, the NGRAN includes one or a plurality of gNBs. Further, the EUTRAN may include a gNB (en-gNB) connected to a core network (EPC) in an LTE communication system (EPS). Similarly, the NGRAN may include an ng-eNB connected to a core network 5GC in a 5G communications system (5GS).

When the base station is the eNB, the gNB, or the like, the base station is sometimes referred to as 3GPP access. When the base station is a wireless access point, the base station is sometimes referred to as non-3GPP access.

The base station may be an optical extension device called RRH (Remote Radio Head) or RU (Radio Unit). When the base station is the gNB, the base station may be a combination of the gNB CU (Central Unit) and the gNB DU (Distributed Unit) explained above or one of the gNB CU (Central Unit) and the gNB DU (Distributed Unit).

Here, the gNB CU hosts a plurality of upper layers (e.g. RRC, SDAP, PDCP) in an access layer (Access Stratum) for communication with the UE. On the other hand, the gNB-DU hosts a plurality of lower layers (e.g. RLC, MAC, or PHY) of the access layer. That is, a part of the message/information explained above or a message/information explained below may be generated by the gNB CU as RRC signaling (quasi-static notification) and the rest may be generated by the gNB-DU as MAC CE or DCI (dynamic notification). Alternatively, instead of this, in the RRC configuration (a part of the message/information explained above or a message/information explained below), for example, some configurations such as IE: cellGroupConfig may be generated by the gNB-DU and the remaining configurations may be generated by the gNB-CU. These configurations may be transmitted and received by an F1 interface explained below The base station may be configured to be capable of communicating with other base stations. For example, when a plurality of base station devices are combinations of eNBs or eNBs and en-gNBs, the base stations may be connected by an X2 interface. Further or instead of this, when a plurality of base stations are a combination of gNBs or gn-eNBs and gNBs, the devices may be connected by an Xn interface. Further or instead of this, when a plurality of base stations are a combination of gNB central units (CUs) and gNB distributed units (DUs), the devices may be connected by the F1 interface explained above. A message/information (Information of RRC signalling, MAC control element (MAC CE), or DCI) explained below may be communicated between a plurality of base stations (for example, via the X2, Xn, and F1 interfaces).

For example, in several embodiments, both of the ground station and the non-ground station may be a combination of gNBs or a combination of eNBs, one of the ground station and the non-ground station may be a combination of gNBs and the other may be a combination of eNBs combination, or one the ground station and the non-ground station may be a combination of gNB-CUs and the other may be a combination of gNB-DUs. That is, when the non-ground station is the gNB and the ground station is the eNB, the gNB of the non-ground station (the satellite station) may carry out connected mobility (handover) or dual connectivity through coordination (for example, X2 signaling or Xn signaling) with the eNB of the ground station. Further or instead of this, when the non-ground station is the gNB-DU and the ground station is the gNB-CU, the gNB-DU of the non-ground station (the satellite station) may configure a logical gNB by coordination (for example, F1 signaling) with the gNB-CU of the ground station.

A cell provided by the base station is referred to as serving cell. The serving cell includes a PCell (Primary Cell) and an SCell (Secondary Cell). When dual connectivity is set in a UE (for example, the terminal device 50), the PCell and zero or one or more SCells provided by an MN (Master Node) is sometimes referred to as master cell group. Examples of the dual connectivity include EUTRA-EUTRA dual connectivity, EUTRA-NR dual connectivity (ENDC), EUTRA-NR dual connectivity with 5GC, NR-EUTRA dual connectivity (NEDC), and NR-NR dual connectivity (NNDC).

Note that the serving cell may include a PSCell (Primary Secondary Cell or Primary SCG Cell). That is, when dual connectivity is configured in the UE, the PSCell and zero or one or more SCells provided by the SN (Secondary Node) is sometimes referred to as SCG (Secondary Cell Group).

Unless specific setting (for example, PUCCH on SCell) is performed, the physical uplink control channel (PUCCH) is transmitted by the PCell and the PSCell but is not transmitted by the SCell. A radio link failure is also detected by the PCell and the PSCell but is not detected by the SCell (may not be detected). As explained above, since the PCell and the PSCell have a special role among the serving cells, the PCell and the PSCell are referred to as SpCell (Special Cell) as well.

One downlink component carrier and one uplink component carrier may be associated with one cell. A system bandwidth corresponding to one cell may be divided into a plurality of bandwidth parts (BWPs). In this case, one or a plurality of BWPs may be set in the UE and one BWP may be used for the UE as an active BWP. Radio resources (for example, a frequency band, a numerology (subcarrier spacing), and a slot configuration (slot configuration)) that can be used by the terminal device 50 may be different for each of cells, each of component carriers, or each of BWPs.

2-6. Configuration of the Relay Station

Subsequently, a configuration of the relay station 40 is explained.

The relay station 40 is a wireless communication device that wirelessly communicates with other communication devices such as the management device 10, the ground station 20, the non-ground station 30, and the terminal device 50. The relay station 40 relays communication between the non-ground station 30 and a communication device (for example, the management device 10, the ground station 20, or the terminal device 50) on the ground.

The relay station 40 in the present embodiment is, for example, a layer 3 relay and is different from a conventional layer 1 relay that only amplifies power of a reception RF signal. Here, the layer 3 relay means a relay capable of decoding up to a layer 3. Note that the relay station 40 may be a smart repeater. Unlike the conventional layer 1 relay, the smart repeater is a relay capable of controlling a physical layer (PHY) or the like as well. Besides, descriptions of relay stations appearing in the following explanation can be replaced with other descriptions indicating relay stations such as relays and relay devices.

Note that the relay station 40 may be a fixed device, a movable device, or a floatable device. The size of the coverage of the relay station 40 is not limited to a specific size. For example, a cell covered by the relay station 40 may be a macro cell, may be a micro cell, or may be a small cell. Naturally, the size of the coverage of the relay station 40 may be extremely small like the size of the coverage of a femto cell. The relay station 40 may have a beamforming capability. In this case, for the relay station 40, a cell or a service area may be formed for each of beams.

In addition, the relay station 40 is not limited to the loaded device if the function of relay is satisfied. For example, the relay station 40 may be loaded on a terminal device such as a smartphone, may be loaded on a vehicle such as an automobile, a train, or a human-powered vehicle, may be loaded on a flying body (a floating body) such as a balloon, an airplane, or a drone, may be loaded on equipment such as a traffic light, a sign, or a street light, or may be loaded on a home appliance such as a television, a game machine, an air conditioner, a refrigerator, or a lighting fixture. The relay station may be provided on an outer wall of a construction (for example, a building). By providing the relay station on the outer wall of the building, even when there is a shield between the base station and the terminal device, a signal from the base station can be transferred by the relay station provided on the outer wall of the building and reach the terminal device.

Besides, similarly to the base station explained above, the relay station 40 may be a device installed in a mobile body or may be the mobile body itself. As explained above, the mobile body may be a mobile terminal such as a smartphone or a cellular phone. The mobile body may be a mobile body that moves on the land (on the ground in a narrow sense) or may be a mobile body that moves underground. Naturally, the mobile body may be a mobile body that moves on water or may be a mobile body that moves underwater. The mobile body may be a mobile body that moves inside the atmosphere or may be a mobile body that moves outside the atmosphere. The relay station 40 may be a ground station device or a non-ground station device. At this time, the relay station 40 may be an aircraft station or a satellite station.

The relay station 40 may be an aircraft station or an earth station. The aircraft station is a wireless station installed, in order to communicate with an aircraft station, on the ground or in a mobile body that moves on the ground. The earth station is a wireless station located on the earth (including the air) in order to communicate with a satellite station (a space station). The earth station may be a large earth station or may be a small earth station such as a VSAT (Very Small Aperture Terminal).

Note that the earth station may be a VSAT controlled earth station (also referred to as master station or HUB station) or a VSAT earth station (also referred to as slave station). The earth station may be a wireless station installed in a mobile body moving on the ground. Examples of an earth station loaded on a ship include earth stations on board vessels (ESV). The earth station may include an aircraft earth station that is installed in an aircraft (including a helicopter) and communicates with a satellite station. The earth station may include an aeronautical earth station that is installed in a mobile body moving on the ground and communicates with the aircraft earth station via a satellite station.

Note that the relay station 40 may be a portable movable wireless station that communicates with a satellite station or an aircraft station.

Figure 13:
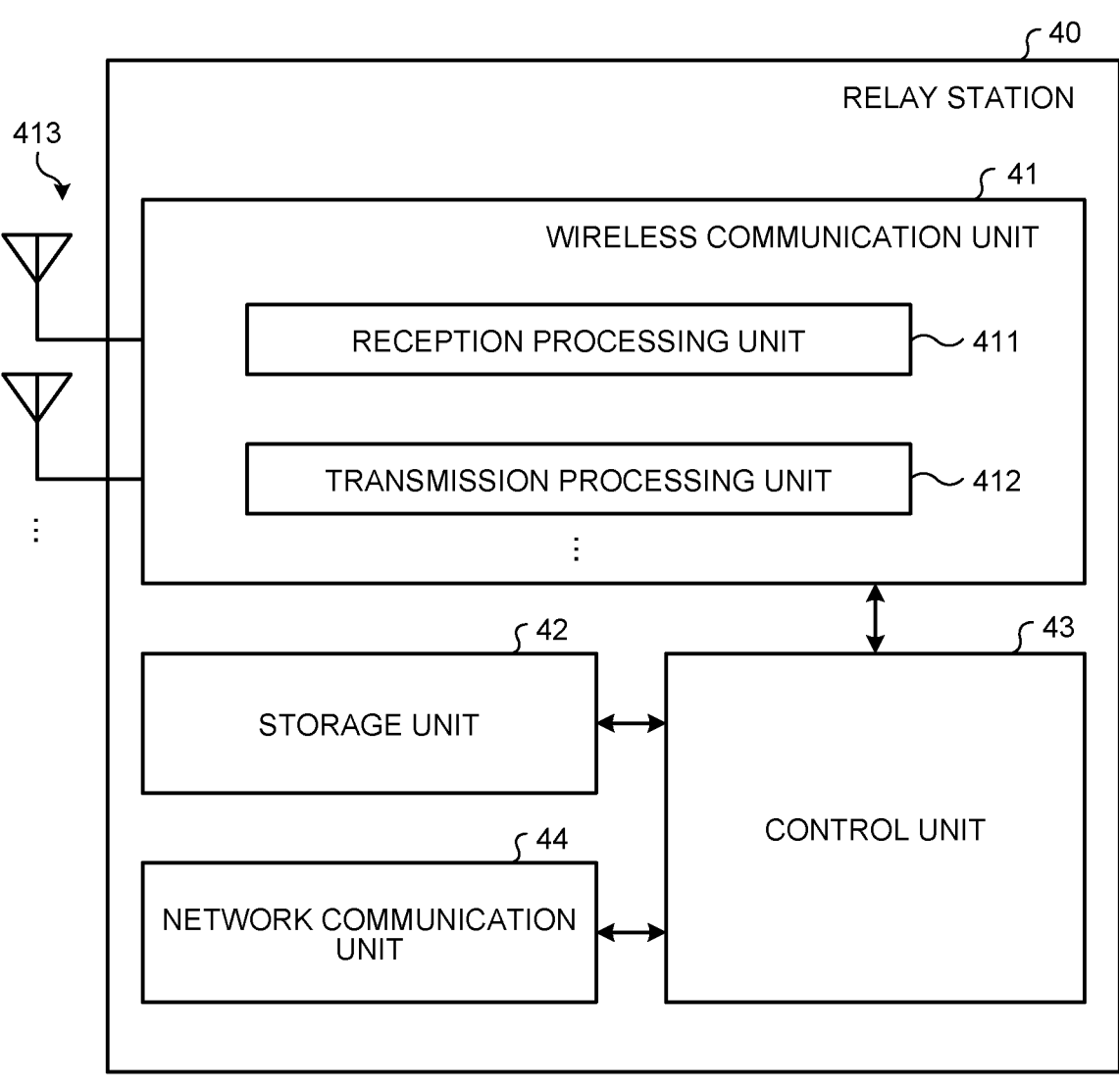
FIG. 13 is a diagram illustrating a configuration example of a relay station according to the embodiment of the present disclosure.

FIG. 13 is a diagram illustrating a configuration example of the relay station 40 according to the embodiment of the present disclosure. The relay station 40 includes a wireless communication unit 41, a storage unit 42, a control unit 43, and a network communication unit 44. Note that the configuration illustrated in FIG. 13 is a functional configuration and the hardware configuration may be different from the functional configuration. The functions of the relay station 40 may be implemented in a distributed manner in a plurality of physically separated components.

The wireless communication unit 41 is a signal processing unit for wirelessly communicating with other wireless communication devices (for example, the ground stations 20, the non-ground stations 30, the relay stations 40, the terminal devices 50, and the other relay stations 40). The wireless communication unit 41 operates under the control of the control unit 43. The wireless communication unit 41 includes a reception processing unit 411, a transmission processing unit 412, and an antenna 413. The configurations of the wireless communication unit 41, the reception processing unit 411, the transmission processing unit 412, and the antenna 413 may be the same as those of the wireless communication unit 21, the reception processing unit 211, the transmission processing unit 212, and the antenna 213 of the ground station 20. The wireless communication unit 41 may be configured to be capable of performing beamforming like the wireless communication unit 21. Like the wireless communication unit 21, the wireless communication unit 41 may be configured to be capable of transmitting and receiving spatially multiplexed signals.

The storage unit 42 is a data readable/writable storage device such as a DRAM, an SRAM, a flash memory, or a hard disk. The storage unit 42 functions as storage means of the relay station 40.

The control unit 43 is a controller that controls the units of the relay station 40. The control unit 43 is realized by a processor such as a CPU, an MPU, or a GPU. For example, the control unit 43 is realized by a processor executing various programs stored in a storage device inside the relay station 40 using a RAM or the like as a work area. Note that the control unit 43 may be realized by an integrated circuit such as an ASIC or an FPGA. All of the CPU, the MPU, the GPU, the ASIC, and the FPGA can be regarded as the controller.

Note that an operation of the control unit 43 of the relay station 40 may be the same as the operation of the control unit 23 of the ground station 20 or the control unit 33 of the non-ground station 30. Conversely, the operation of the control unit 23 of the ground station 20 or the control unit 33 of the non-ground station 30 may be the same as the operation of the control unit 43 of the relay station 40.

The network communication unit 44 is a communication interface for communicating with other devices. The network communication unit 44 is, for example, a network interface. For example, the network communication unit 44 is a LAN interface such as an NIC. Note that the network communication unit 44 may be a wired interface or may be a wireless interface. The network communication unit 44 functions as communication means of the relay station 40. The network communication unit 44 communicates with the management device 10, the ground station 20, and the like according to control of the control unit 43.

2-7. Configuration of the Terminal Device

Subsequently, a configuration of the terminal device 50 is explained.

The terminal device 50 is a wireless communication device that wirelessly communicates with other communication devices such as the ground stations 20 and the non-ground stations 30. The terminal device 50 is, for example, a cellular phone, a smart device (a smartphone or a tablet), a PDA (Personal Digital Assistant), or a personal computer. The terminal device 50 may be equipment such as a camera for business use including a communication function or may be a motorcycle, a moving relay vehicle, or the like on which a communication device such as an FPU (Field Pickup Unit) is loaded. The terminal device 50 may be an M2M (Machine to Machine) device or an IoT (Internet of Things) device.

Note that the terminal device 50 may be capable of performing NOMA communication with the ground station 20. The terminal device 50 may be capable of using an automatic retransmission technique such as an HARQ when communicating with the ground station 20. The terminal device 50 may be capable of performing side-link communication with the other terminal devices 50. The terminal device 50 may also be capable of using the automatic retransmission technique such as the HARQ when performing the side-link communication. Note that the terminal device 50 may also be capable of performing NOMA communication in communication (side-link) with the other terminal devices 50. Further, the terminal device 50 may be capable of performing LPWA communication with the other communication devices (for example, the ground stations 20 and the other terminal devices 50). The wireless communication used by the terminal device 50 may be wireless communication using millimeter waves. Note that the wireless communication (including side-link communication) used by the terminal device 50 may be wireless communication using radio waves or wireless communication (optical wireless) using infrared rays or visible light.

Furthermore, the terminal device 50 may be a mobile device. The mobile device is a movable wireless communication device. At this time, the terminal device 50 may be a wireless communication device installed in a mobile body or may be the mobile body itself. For example, the terminal device 50 may be a vehicle that moves on a road such as an automobile, a bus, a truck, or a motorcycle, a vehicle that moves on a rail installed on a track such as a train, or a wireless communication device loaded on the vehicle. Note that the mobile body may be a mobile terminal or may be a mobile body that moves on the land (the ground in a narrow sense), underground, on water, or underwater. The mobile body may be a mobile body that moves inside the atmosphere such as a drone or a helicopter or may be a mobile body that moves outside the atmosphere such as an artificial satellite.

The terminal device 50 may be simultaneously connected to a plurality of base stations or a plurality of cells to implement communication. For example, when one base station supports a communication area via a plurality of cells (for example, pCells or sCells), the plurality of cells can be bundled to perform communication between the ground stations 20 and the terminal device 50 by a carrier aggregation (CA) technology, a dual connectivity (DC) technology, or a multi-connectivity (MC) technology. Alternatively, via cells of different ground stations 20, with a coordinated multi-point transmission and reception (CoMP) technology, the terminal device 50 and those plurality of ground stations 20 can communicate.

Figure 14:
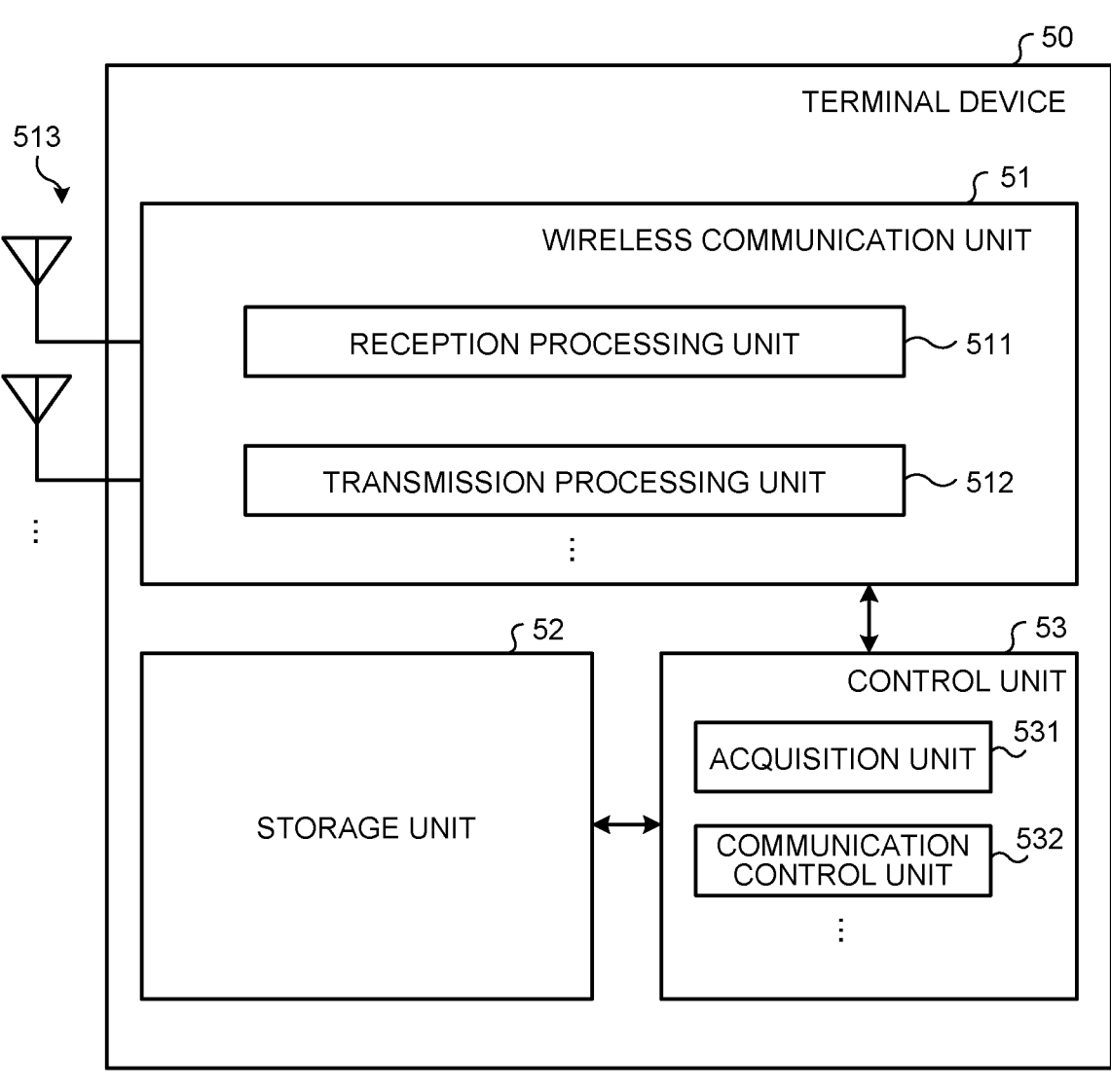
FIG. 14 is a diagram illustrating a configuration example of a terminal device according to the embodiment of the present disclosure.

FIG. 14 is a diagram illustrating a configuration example of the terminal device 50 according to the embodiment of the present disclosure. The terminal device 50 includes a wireless communication unit 51, a storage unit 52, and a control unit 53. Note that the configuration illustrated in FIG. 14 is a functional configuration. A hardware configuration may be different from this configuration. The functions of the terminal device 50 may be implemented in a distributed manner in a plurality of physically separated components.

The wireless communication unit 51 is a signal processing unit for wirelessly communicating with other wireless communication devices (for example, the ground stations 20, the non-ground stations 30, the relay stations 40, and the other terminal devices 50.). The wireless communication unit 51 operates according to control of the control unit 53. The wireless communication unit 51 includes a reception processing unit 511, a transmission processing unit 512, and an antenna 513. The configurations of the wireless communication unit 51, the reception processing unit 511, the transmission processing unit 512, and the antenna 513 may be the same as the configurations of the wireless communication unit 21, the reception processing unit 211, the transmission processing unit 212, and the antenna 213 of the ground station 20. The wireless communication unit 51 may be configured to be capable of performing beamforming like the wireless communication unit 21. Like the wireless communication unit 21, the wireless communication unit 51 may be configured to be capable of transmitting and receiving spatially multiplexed signals.

The storage unit 52 is a data readable/writable storage device such as a DRAM, an SRAM, a flash memory, or a hard disk. The storage unit 52 functions as storage means of the terminal device 50.

The control unit 53 is a controller that controls the units of the terminal device 50. The control unit 53 is realized by a processor such as a CPU, an MPU, or a GPU. For example, the control unit 53 is realized by the processor executing various programs stored in a storage device inside the terminal device 50 using a RAM or the like as a work area. Note that the control unit 53 may be realized by an integrated circuit such as an ASIC or an FPGA. All of the CPU, the MPU, the GPU, the ASIC, and the FPGA can be regarded as the controller.

The control unit 53 includes an acquisition unit 531 and a communication control unit 532. The blocks (the acquisition unit 531 to the communication control unit 532) configuring the control unit 53 are respectively functional blocks indicating functions of the control unit 53. These functional blocks may be software blocks or may be hardware blocks. For example, each of the functional blocks explained above may be one software module realized by software (including micro programs) or may be one circuit block on a semiconductor chip (die). Naturally, each of the functional blocks may be one processor or one integrated circuit. The control unit 53 may be configured by functional units different from the functional blocks explained above. A configuration method for the functional blocks is optional. Operations of the functional blocks are explained below.

3. Operation of the Communication System

The configuration of the communication system 1 is explained above. Subsequently, an operation of the communication system 1 is explained.

3-1. Overview of Processing

As explained above, the communication system 1 is a communication system in which communication between the non-ground station 30 and the terminal device 50 is uni-directional relay communication. In the present embodiment, the non-ground station 30 and the terminal device 50 are enabled to perform retransmission processing in E2E (End-to-End).

For example, the non-ground station 30 acquires an E2E HARQ ID between the terminal device 50 and the non-ground station 30 different from at least one HARQ ID of an HARQ ID for communication between the terminal device 50 and the relay station 40 and an HARQ ID for communication between the non-ground station 30 and the relay station 40. The HARQ ID is, for example, an HARQ process ID. Then, the non-ground station 30 performs uni-directional relay communication with the terminal device 50 using the E2E HARQ ID.

Consequently, even in an environment in which an HARQ between the non-ground station 30 and the relay station 40 is disabled, end-to-end retransmission processing can be performed in a PHY layer and a MAC layer. Since the terminal device 50 or the non-ground station 30 can quickly learn success/failure of communication not via the relay station, the terminal device 50 or the non-ground station 30 can quickly execute the retransmission processing. As a result, since a delay relating to the retransmission processing decreases, the communication system 1 can realize high communication performance.

Note that, in the following explanation, it is assumed that uni-directional relay communication is performed between the base station and the terminal device 50 in the communication system 1. The base station in the following explanation can be replaced with the non-ground station 30 (the non-ground base station) that operates as a communication device. The base station in the following explanation can be replaced with the ground station 20 (the ground base station). That is, the present technique is applicable not only to communication between the non-ground station 30 and the terminal device 50 but also to communication between the ground station 20 and the terminal device 50.

In the following explanation, a resource indicates, for example, a frequency, a time, a resource element (including REG, CCE, and CORESET), a resource block, a bandwidth part, a component carrier, a symbol, a sub-symbol, a slot, a mini-slot, a subslot, a subframe, a frame, a PRACH occasion, an occasion, a code, a multi-access physical resource, a multi-access signature, or subcarrier spacing (numerology). Naturally, the resources are not limited to these examples.

The operation of the communication system 1 is explained in detail below. In the following explanation, the operation of the communication system 1 is roughly divided into an operation in the case of uplink uni-directional relay and an operation in the case of downlink uni-directional relay.

3-2. Uplink Uni-Directional Relay

First, an operation of the communication system 1 in the case of the uplink uni-directional relay is explained.

Figure 15:
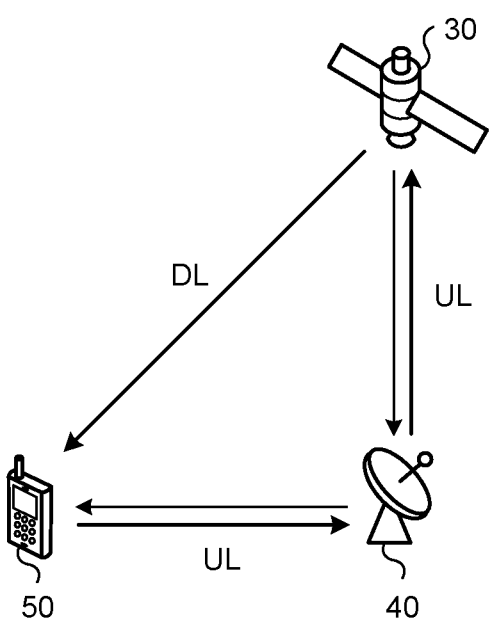
FIG. 15 is a diagram illustrating uplink uni-directional relay.

FIG. 15 is a diagram illustrating the uplink uni-directional relay. The uplink uni-directional relay is a uni-directional relay in which an uplink is relay communication and a downlink is direct communication. In the example of FIG. 15, the base station is the non-ground station 30. However, the base station may be the ground station 20.

In the following explanation, an operation of the communication system 1 in the case of the uplink uni-directional relay is explained separately for an operation of uplink data transmission and an operation of downlink data transmission.

3-2-1. Uplink Data Transmission

First, the operation of the uplink data transmission of the communication system 1 in the uplink uni-directional relay is explained. The operation of the uplink data transmission is divided into (A1) to (A6) described below. The base station, the relay station 40, or the terminal device 50 sequentially executes operations explained in (A1) to (A6) described above.

(A1) Disabling of an HARQ between the base station and the relay station 40

(A2) Notification of uplink grant from relay station 40 to terminal device 50

(A3) Transmission of uplink data from the terminal device 50 to the relay station 40

(A4) Response from the relay station 40 to the terminal device 50

(A5) Relay transmission of uplink data from the relay station 40 to the base station (A6) Transmission of response data from the base station to the terminal device 50

(A1) to (A6) described above are explained below.

(A1) Disabling of an HARQ Between the Base Station and The Relay Station 40

The base station may notify the relay station 40 that ACK/NACK is disabled. That is, the base station may notify the relay station 40 that an ACK/NACK response is not made. The ACK/NACK here is ACK/NACK relating to an HARQ ID in a link between the base station and the relay station 40. The disabling of the ACK/NACK may be paraphrased as disabling of an HARQ. The disabling the ACK/NACK between the base station and the relay station 40 may be determined in advance under predetermined conditions.

When the base station notifies the disabling of the ACK/NACK, the base station does not respond to the relay station 40 with the ACK/NACK even if the uplink data is transmitted from the relay station 40. In this case, after relay-transmitting the uplink data from the terminal device 50 to the base station, the relay station 40 may erase the uplink data from a buffer. When a plurality of pieces of uplink data from the terminal device 50 is relay-transmitted, overflow of the buffer can also be prevented.

It should be noted that this disabling of the ACK/NACK disables the ACK/NACK of the link between the base station and the relay station 40 and does not disable the E2E ACK/NACK (that is, between the base station and the terminal device 50).

Here, ACK/NACK between the relay station 40 and the terminal device 50 may be enabled or may be disabled. ACK/NACK from the base station to the terminal device 50 (that is, E2E ACK/NACK) is enabled.

(A2) Notification of Uplink Grant from Relay Station 40 to Terminal Device 50

Subsequently, the relay station 40 notifies the terminal device 50 of an uplink grant for performing uplink data transmission. Here, the terminal device 50 may transmit a scheduling request to the relay station 40 in order to perform uplink data transmission.

The uplink grant may include information concerning an HARQ ID used in E2E retransmission processing. Here, the HARQ ID used in the E2E retransmission processing may be determined based on information acquired in advance from the base station by the relay station 40. The HARQ ID used in the E2E retransmission processing is sometimes referred to as E2E HARQ ID.

Note that the information concerning the E2E HARQ ID may not be the E2E HARQ ID itself if the terminal device 50 can finally specify the E2E HARQ ID. The relay station 40 may explicitly notify the terminal device 50 of the E2E HARQ ID acquired in advance from the base station by using, for example, a downlink control signal (DCI: Downlink Control Information). The relay station 40 may implicitly notify the terminal device 50 of the E2E HARQ ID.

(A3) Transmission of Uplink Data from the Terminal Device 50 to the Relay Station 40

When an uplink grant is notified, the terminal device 50 transmits uplink data to the relay station 40 based on the uplink grant. Here, the terminal device 50 transmits the uplink data using the E2E HARQ ID notified from the relay station 40.

(A4) Response from the Relay Station 40 to the Terminal Device 50

When receiving the uplink data from the terminal device 50, the relay station 40 transmits ACK/NACK to the terminal device 50. Alternatively, the relay station 40 notifies the terminal device 50 of an uplink grant for retransmission.

Note that, when the ACK/NACK between the relay station 40 and the terminal device 50 is disabled, the relay station 40 may not notify the terminal device 50 of the ACK/NACK or the uplink grant for retransmission.

The terminal device 50 performs retransmission when receiving the NACK from the relay station 40. On the other hand, when receiving the ACK from the relay station 40, the terminal device 50 determines that the transmission to the relay station 40 is successful. At this time, the relay station 40 does not use the same HARQ ID between the terminal device 50 and the relay station 40 until the data transmission is completed in the E2E. The terminal device 50 may not erase transmission data of the HARQ ID until the data transmission is completed in the E2E.

(A5) Relay Transmission of Uplink Data from the Relay Station 40 to the Base Station Subsequently, the relay station 40 transmits the uplink data received from the terminal device 50 to the base station. At this time, the relay station 40 may transmit a scheduling request to the base station to request a resource for uplink data transmission. Then, the base station may transmit an uplink data transmission grant to the relay station 40. The relay station 40 relay-transmits the received uplink data to the base station according to information of the notified uplink data transmission grant.

Note that an HARQ ID used by the relay station 40 in the relay transmission may be an HARQ ID different from the E2E HARQ ID. By using the HARQ ID different from the E2E HARQ ID, flexibility of the HARQ ID used by the relay station 40 for the uplink data transmission can be improved. For example, even if the E2E HARQ ID received from one of the plurality of terminal devices 50 and the E2E HARQ ID received from another terminal device 50 are the same ID, the relay station 40 can use other IDs in uplink data transmissions regardless of the ID.

Note that an HARQ ID used by the relay station 40 for communication with the base station may be the E2E HARQ ID used in the E2E retransmission processing. That is, the relay station 40 may relay the uplink data using the E2E HARQ ID.

Note that the relay station 40 may notify the base station of the HARQ ID for the E2E retransmission processing.

(A6) Transmission of Response Data from the Base Station to the Terminal Device 50

Subsequently, the base station transmits ACK/NACK to the terminal device 50 by direct communication. Alternatively, the base station transmits an uplink grant for retransmission to the terminal device 50 by direct communication.

Here, the base station may notify, in advance, the terminal device 50 ACK/NACK corresponding to which E2E HARQ ID the ACK/NACK corresponds. ACK/NACK corresponding to which E2E HARQ ID the ACN/NACK corresponds may be determined in advance under a predetermined condition. Consequently, the terminal device 50 can learn that the data has been correctly transmitted to the base station.

On the other hand, the relay station 40 needs to learn that the HARQ ID for the E2E retransmission processing has been correctly transmitted to the base station. As means for this, for example, methods described in (A6-1) and (A6-2) described below are conceivable.

(A6-1) Reception of ACK/NACK from the Base Station

The relay station 40 also receives the information of the ACK/NACK transmitted from the base station to the terminal device 50.

(A6-2) Reception of ACK/NACK from Terminal Device

The terminal device 50 that has received the information concerning the ACK/NACK notifies the relay station 40 of the information concerning the ACK/NACK. At this time, the terminal device 50 may notify the relay station 40 of the information concerning the ACK/NACK using a predetermined resource for ACK/NACK transmission. In addition, the terminal device 50 may transmit the information concerning the ACK/NACK to the relay station 40 together with a scheduling request.

At this time, the terminal device 50 may notify the relay station 40 of information concerning first transmission or retransmission such as a new data indicator instead of the information concerning the ACK/NACK. Alternatively, the terminal device 50 may notify the relay station 40 of HARQ ID information instead of the information concerning the ACK/NACK.

Note that the scheduling request is a scheduling request for requesting an uplink grant for first transmission of the next data when the terminal device 50 receives ACK from the base station. The scheduling request is a scheduling request for requesting an uplink grant for retransmission when the terminal device 50 receives NACK.

Sequence Example

The operation of the uplink data transmission of the communication system 1 in the uplink uni-directional relay is explained above. A sequence example of this operation is explained below.

Figure 16:
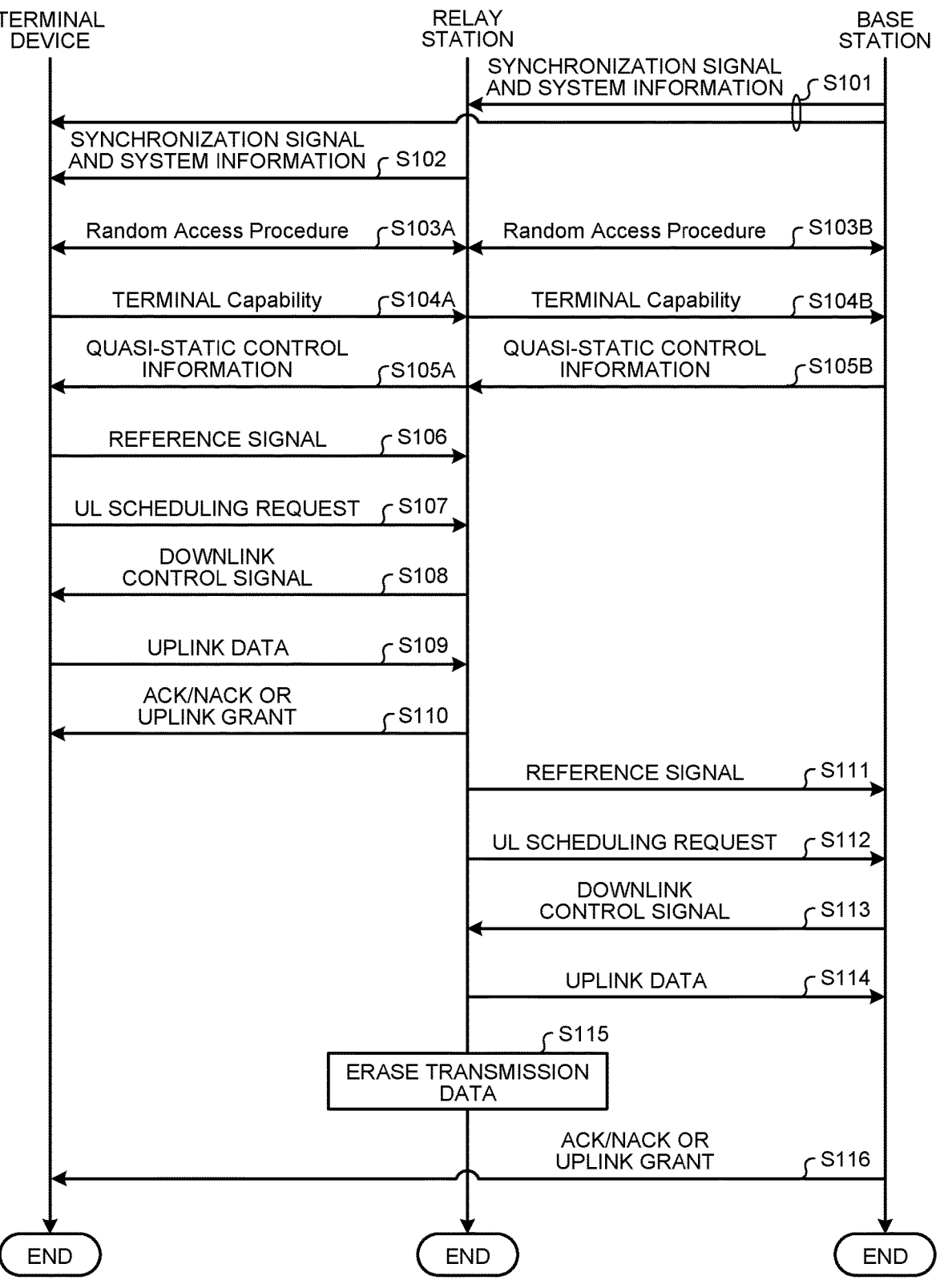
FIG. 16 is a sequence chart illustrating an operation of uplink data transmission of the communication system in the uplink uni-directional relay.

FIG. 16 is a sequence chart illustrating the operation of the uplink data transmission of the communication system 1 in the uplink uni-directional relay. The operation of the uplink data transmission of the communication system 1 in the uplink uni-directional relay is explained below with reference to FIG. 16.

First, the relay station 40 and the terminal device 50 receive a synchronization signal and system information from the base station (step S101). The terminal device 50 receives the synchronization signal and the system information from the relay station 40 (step S102). Then, each of the base station, the relay station 40, and the terminal device 50 performs a random access procedure (steps S103A and S103B).

The terminal device 50 transmits its own capability information (hereinafter referred to as terminal capability information) to the relay station 40 (step S104A). The relay station 40 transmits the terminal capability information to the base station (step S104B).

Subsequently, the base station notifies the relay station 40 of quasi-static control information (step S105A). Then, the relay station 40 transmits the quasi-static control information to the terminal device 50 (step S105B). Here, the quasi-static control information may include the information explained in (A1) above. That is, the quasi-static information may include notification indicating that the ACK/NACK of the link between the base station and the relay station 40 is disabled. The quasi-static information may include notification indicating that the ACK/NACK between the relay station 40 and the terminal device 50 is enabled or disabled.

Next, the terminal device 50 transmits a reference signal for uplink channel state estimation to the relay station 40 (step S106). For example, the terminal device 50 transmits an SRS (Sounding Reference Signal) as a reference signal for uplink channel state estimation. Subsequently, the terminal device 50 transmits an uplink scheduling request to the relay station 40 (step S107).

When receiving the uplink scheduling request from the terminal device 50, the relay station 40 transmits a downlink control signal to the terminal device 50 (step S108). The acquisition unit 531 of the terminal device 50 acquires the downlink control signal from the relay station 40. Here, the downlink control signal may include the information explained in (A2) above. That is, the downlink control signal may include information of an uplink grant for the terminal device 50 to perform uplink data transmission. Note that, as explained in (A2) above, the uplink grant may include information concerning the E2E HARQ ID.

Subsequently, the terminal device 50 transmits uplink data to the relay station 40 (step S109). For example, the terminal device 50 transmits the uplink data on a PUSCH (Physical Uplink Shared Channel). Here, as explained in (A3) above, the communication control unit 532 of the terminal device 50 transmits the uplink data using the E2E HARQ ID.

When receiving the uplink data from the terminal device 50, the relay station 40 responds to the terminal device 50. For example, as explained in (A4) above, the relay station 40 transmits ACK/NACK or an uplink grant for retransmission to the terminal device 50 (step S110). Note that, even when the ACK is received from the relay station 40, the terminal device 50 may not erase the uplink data transmitted to the relay station 40 from the buffer until the E2E transmission is completed (for example, until an ACK is received in step S116 explained below).

Subsequently, the relay station 40 transmits a reference signal for uplink channel state estimation to the base station (step S111). For example, the relay station 40 transmits an SRS (Sounding Reference Signal) as a reference signal for uplink channel state estimation. Subsequently, the relay station 40 transmits an uplink scheduling request to the base station (step S112).

When receiving the uplink scheduling request from the relay station 40, the base station transmits a downlink control signal to the relay station 40 (step S113). The downlink control signal may include information of an uplink grant for the relay station 40 to perform uplink data transmission.

Subsequently, the relay station 40 transmits uplink data to the base station (step S109). For example, the relay station 40 transmits the uplink data on a PUSCH (Physical Uplink Shared Channel). Here, as explained in (A5) above, the relay station 40 may transmit the uplink data using an HARQ ID different from the E2E HARQ ID.

When the ACK/NACK (HARQ) of the link between the base station and the relay station 40 is disabled, the relay station 40 may erase the uplink data from the buffer (step S115).

When receiving the uplink data from the relay station 40, the base station responds to the terminal device 50. For example, as explained in (A6) above, the base station transmits the ACK/NACK corresponding to the E2E HARQ ID or the uplink grant for retransmission to the terminal device 50 (step S116). If the base station is the non-ground station 30, this response is made by, for example, the communication control unit 332 of the non-ground station 30.

According to this operation, since the terminal device 50 can quickly learn success/failure of the communication not via the relay station 40, the terminal device 50 can quickly execute the retransmission processing. As a result, since a delay relating to the retransmission processing decreases, the communication system 1 can realize high communication performance.

3-2-2. Downlink Data Transmission

Subsequently, an operation of downlink data transmission of the communication system 1 in the uplink uni-directional relay is explained. The operation of the downlink data transmission is divided into (B1) to (B5) described below. The base station, the relay station 40, or the terminal device 50 sequentially executes operations described in (B1) to (B5).

(B1) Disable an HARQ between the terminal device 50 and the base station (B2) Transmission of a downlink control signal from the base station to the terminal device 50

(B3) Transmission of downlink data from the base station to the terminal device 50

(B4) Transmission of response data from the terminal device 50 to the relay station 40

(B5) Relay transmission of the response data from the relay station 40 to the base station The (B1) to (B5) described above are respectively explained below.

(B1) Disable an HARQ Between the Terminal Device 50 And the Base Station

The base station may notify the terminal device 50 that ACK/NACK using a direct link between the terminal device 50 and the base station is disabled. When there is the notification of the disabling, the terminal device 50 does not perform ACK/NACK transmission using the direct link to the base station. That is, in order to transmit the ACK/NACK for downlink data from the base station, the terminal device 50 transmits the ACK/NACK via the relay station 40.

Note that this disabling is disabling of ACK/NACK of the direct link between the base station and the terminal device 50 and is not disabling of the E2E ACK/NACK.

ACK/NACK of links between the relay station 40 and the terminal device 50 and between the relay station 40 and the base station is enabled. That is, E2E ACK/NACK via the relay station 40 is enabled.

(B2) Transmission of a Downlink Control Signal from The Base Station to the Terminal Device 50

Subsequently, the base station transmits a downlink control signal to the terminal device 50. The downlink control signal may include information concerning the E2E HARQ ID. As explained above, the E2E HARQ ID is the HARQ ID used in the E2E retransmission processing. Consequently, the terminal device 50 acquires the information concerning the E2E HARQ ID in advance from the base station.

Note that the information concerning the E2E HARQ ID may not be the E2E HARQ ID itself if the terminal device 50 can finally specify the E2E HARQ ID. The base station may explicitly notify or may implicitly notify the terminal device 50 of the E2E HARQ ID.

(B3) Transmission of Downlink Data from the Base Station to the Terminal Device 50

Subsequently, the base station transmits downlink data to the terminal device 50 by direct communication. Here, the base station transmits the downlink data with the E2E HARQ ID notified to the terminal device 50.

(B4) Transmission of Response Data from the Terminal Device 50 to the Relay Station 40

When receiving the downlink data, the terminal device 50 transmits ACK/NACK corresponding to the E2E HARQ ID to the relay station 40. The base station may notify, with the direct link, the terminal device 50 of the information concerning a resource for transmitting the ACK/NACK. The relay station 40 may notify the terminal device 50 of the information concerning the resource for transmitting the ACK/NACK. In this case, the terminal device 50 may transmit a scheduling request for the ACK/NACK transmission to the relay station 40.

(B5) Relay Transmission of the Response Data from the Relay Station 40 to the Base Station The relay station 40 sends, to the base station, ACK/NACK corresponding to the E2E HARQ ID. The base station may notify the relay station 40 of the information concerning the resource for transmitting the ACK/NACK. In this case, the relay station 40 may transmit a scheduling request for the ACK/NACK transmission to the base station.

Sequence Example

The operation of the downlink data transmission of the communication system 1 in the uplink uni-directional relay is explained above. A sequence example of this operation is explained below.

Figure 17:
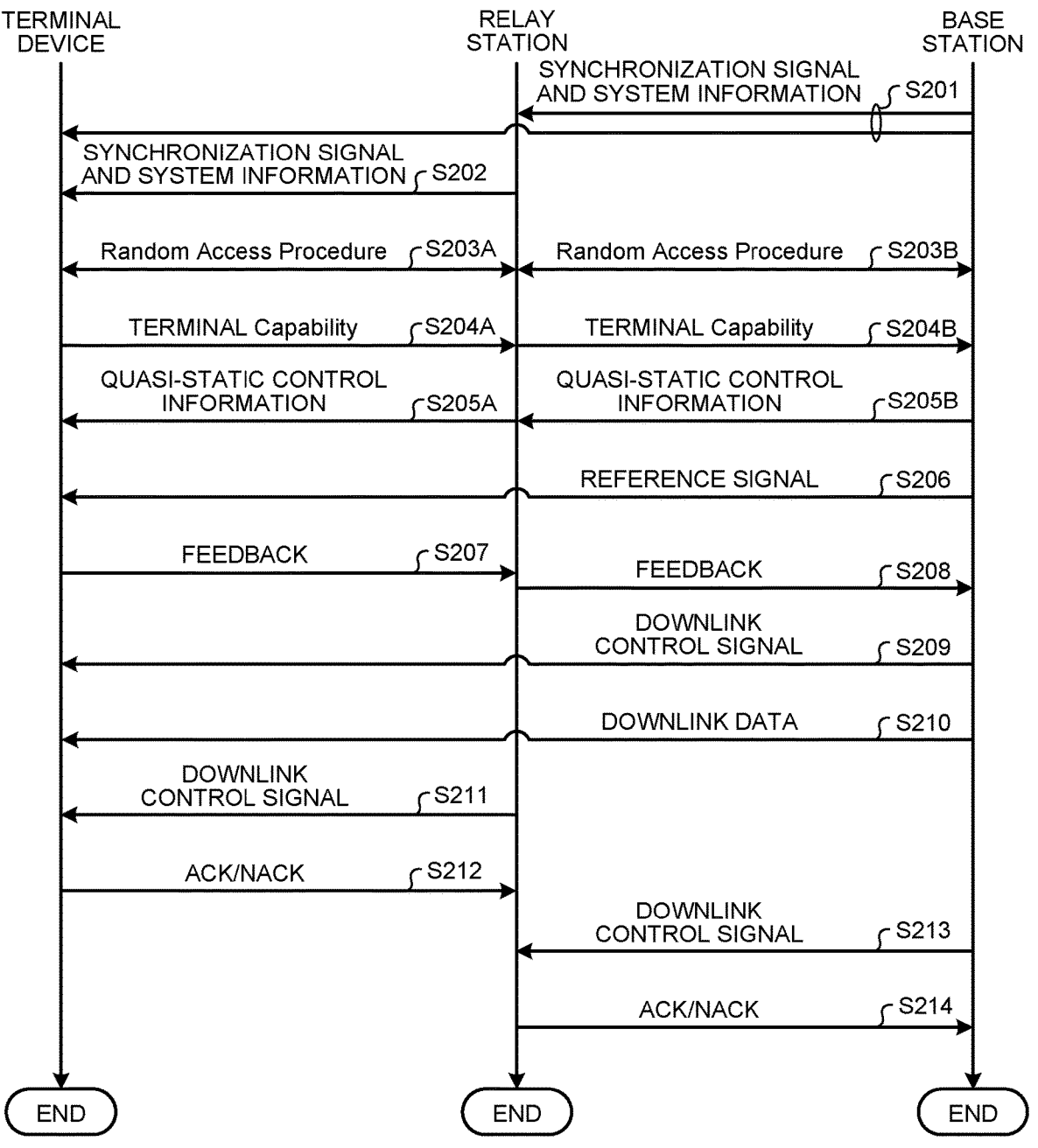
FIG. 17 is a sequence chart illustrating an operation of downlink data transmission of the communication system in the uplink uni-directional relay.

FIG. 17 is a sequence chart illustrating the operation of the downlink data transmission of the communication system 1 in the uplink uni-directional relay. The operation of the downlink data transmission of the communication system 1 in the uplink uni-directional relay is explained below with reference to FIG. 17.

First, the relay station 40 and the terminal device 50 receive a synchronization signal and system information from the base station (step S201). Further, the terminal device 50 receives the synchronization signal and the system information from the relay station 40 (step S202). Then, each of the base station, the relay station 40, and the terminal device 50 performs a random access procedure (steps S203A and S203B).

The terminal device 50 transmits its own capability information (hereinafter referred to as terminal capability information) to the relay station 40 (step S204A). The relay station 40 transmits the terminal capability information to the base station (step S204B).

Subsequently, the base station notifies the relay station 40 of quasi-static control information (step S205A). Then, the relay station 40 transmits the quasi-static control information to the terminal device 50 (step S205B). Here, the quasi-static control information may include the information explained in (B1) above. That is, the quasi-static information may include notification indicating that the ACK/NACK of the link between the base station and the relay station 40 is disabled. The quasi-static information may include notification indicating that the ACK/NACK between the relay station 40 and the terminal device 50 is enabled or disabled.

Next, the base station transmits a reference signal for downlink channel state estimation to the terminal device 50 (step S206). For example, the base station transmits a CSI-RS (Channel State Information Reference Signal) as the reference signal for downlink channel state estimation. When receiving the reference signal, the terminal device 50 transmits downlink channel state feedback to the relay station 40 (step S207). The relay station 40 transmits the downlink channel state feedback to the base station (step SS208). The downlink channel state feedback is, for example, a CSI feedback (Channel State Information Feedback).

When receiving the feedback from the terminal device 50, the base station transmits a downlink control signal to the terminal device 50 (step S209). Here, the downlink control signal may include the information explained in (B2) above. That is, the downlink control signal may include information concerning the E2E HARQ ID. The acquisition unit 531 of the terminal device 50 receives the downlink control signal including the information concerning the E2E HARQ ID from the base station.

Subsequently, the base station transmits downlink data to the terminal device 50 (step S210). For example, the base station transmits the downlink data on a PDSCH (Physical Downlink Shared Channel). Here, the base station transmits the downlink data by using the E2E HARQ ID as explained in (B3) above. If the base station is the non-ground station 30, for example, the communication control unit 332 of the non-ground station 30 transmits the uplink data.

Subsequently, the relay station 40 transmits a downlink control signal to the terminal device 50 (step S211). The downlink control signal may include information concerning a resource for the terminal device 50 to transmit ACK/NACK. Note that the base station may notify the terminal device 50 of the information concerning the resource via the direct link. Then, the terminal device 50 transmits a response to the downlink data to the relay station 40 (step S212). For example, the terminal device 50 transmits the ACK/NACK corresponding to the E2E HARQ ID to the relay station 40 as explained in (B4) above.

Subsequently, the base station transmits a downlink control signal to the relay station 40 (step S213). The downlink control signal may include information concerning a resource for the relay station 40 to transmit ACK/NACK. Then, the relay station 40 transfers the response from the terminal device 50 to the base station (step S214). For example, the relay station 40 transmits the ACK/NACK corresponding to the E2E HARQ ID to the base station as explained in (B5) above.

According to this operation, the terminal device 50 can reliably transmit, to the base station, via the relay station 40, the response to the downlink data by the direct communication from the base station.

3-3. Downlink Uni-Directional Relay

Subsequently, the operation of the communication system 1 in the case of the downlink uni-directional relay is explained.

Figure 18:
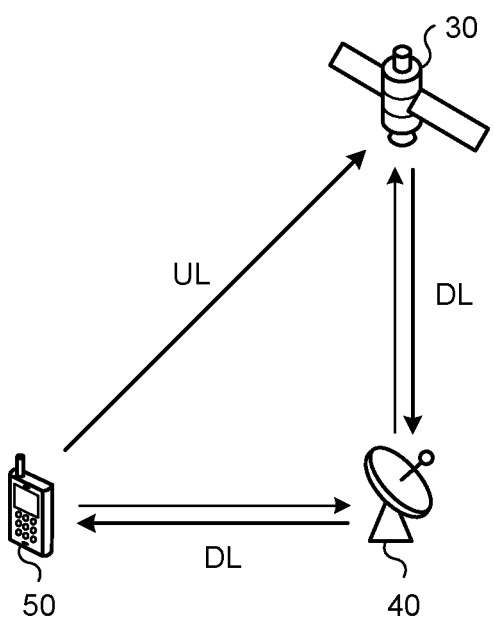
FIG. 18 is a diagram illustrating downlink uni-directional relay.

FIG. 18 is a diagram illustrating the downlink uni-directional relay. The downlink uni-directional relay is a uni-directional relay in which a downlink is relay communication and an uplink is direct communication. In an example illustrated in FIG. 18, the base station is the non-ground station 30. However, the base station may be the ground station 20.

A downlink uni-directional relay explained below is advantageous when emergency data is transmitted in the uplink. Specifically, compared with when the uplink is transmitted through the relay station 40, since the uplink is direct communication from the terminal device 50 to the base station, a transmission delay decreases.

An operation of the communication system 1 in the case of the downlink uni-directional relay is explained separately for an operation of downlink data transmission and an operation of uplink data transmission.

3-3-1. Downlink Data Transmission

First, the operation of the downlink data transmission of the communication system 1 in the downlink uni-directional relay is explained. The operation of the downlink data transmission is divided into (C1) to (C7) described below. The base station, the relay station 40, or the terminal device 50 sequentially executes operations explained in (C1) to (C7) described above.

(C1) Disabling of an HARQ between the base station and the relay station 40

(C2) Transmission of a downlink control signal from the base station to the relay station 40

(C3) Transmission of downlink data from the base station to the relay station 40

(C4) Transmission of a downlink control signal from the relay station 40 to the terminal device 50

(C5) Relay transmission of the downlink data from the relay station 40 to the terminal device 50

(C6) Transmission of response data from the terminal device 50 to the relay station 40

(C7) Transmission of response data from the terminal device 50 to the base station by direct communication (C1) to (C7) described above are respectively explained.

(C1) Disabling of an HARQ Between the Base Station and The Relay Station 40

The base station may notify the relay station 40 that ACK/NACK is disabled. The ACK/NACK here is ACK/NACK relating to an HARQ ID in a link between the base station and the relay station 40. As explained above, the disabling of the ACK/NACK may be paraphrased as disabling of an HARQ. When receiving the notification of the disabling of the ACK/NACK, the relay station 40 does not respond to the base station with ACK/NACK even if downlink data is transmitted from the base station.

It should be noted that this disabling of the ACK/NACK disables the ACK/NACK of the link between the base station and the relay station 40 and does not disable the E2E ACK/NACK (that is, between the base station and the terminal device 50).

Here, ACK/NACK between the relay station 40 and the terminal device 50 may be enabled or may be disabled. The ACK/NACK from the terminal device 50 to the base station (that is, the E2E ACK/NACK) is enabled.

(C2) Transmission of a Downlink Control Signal from The Base Station to the Relay Station 40

Subsequently, the base station transmits a downlink control signal to the relay station 40. The downlink control signal may include information concerning the E2E HARQ ID. As explained above, the E2E HARQ ID is the HARQ ID used in the E2E retransmission processing. Consequently, the relay station 40 acquires the information concerning the E2E HARQ ID beforehand from the base station.

Note that the information concerning the E2E HARQ ID may not be the E2E HARQ ID itself if the relay station 40 can finally specify the E2E HARQ ID. The base station may explicitly notify or may implicitly notify the relay station 40 of the E2E HARQ ID.

(C3) Transmission of Downlink Data from the Base Station to the Relay Station 40

Subsequently, the base station transmits downlink data to the relay station 40. Here, the base station transmits the downlink data with the E2E HARQ ID notified to the relay station 40.

Note that the base station does not use the same HARQ ID between the base station and the relay station 40 until the data transmission in the E2E is completed. However, in the case of data transmission to the other terminal devices 50, the same HARQ ID can be used. The base station may not erase transmission data of the HARQ ID until the data transmission is completed in the E2E.

(C4) Transmission of a Downlink Control Signal from The Relay Station 40 to the Terminal Device 50

Subsequently, the relay station 40 transmits downlink control information to the terminal device 50. The downlink control signal includes information concerning the E2E HARQ ID received from the base station. Note that the downlink control signal may include information concerning an HARQ ID different from the E2E HARQ ID.

(C5) Relay Transmission of the Downlink Data from the Relay Station 40 to the Terminal Device 50

The relay station 40 relay-transmits the downlink data received from the base station to the terminal device 50. The relay station 40 relay-transmits the downlink data received from the base station to the terminal device 50 according to the downlink control information transmitted to the terminal device 50. Here, the HARQ ID used by the relay station 40 for relay transmission is an HARQ ID different from the E2E HARQ ID. Note that the relay station 40 may relay-transmit the E2E HARQ ID to the terminal device 50 according to the relay transmission of the downlink data.

(C6) Transmission of Response Data from the Terminal Device 50 to the Relay Station 40

When receiving the downlink data, the terminal device 50 transmits ACK/NACK to the relay station 40. Note that, when the ACK/NACK between the relay station 40 and the terminal device 50 is disabled, the terminal device 50 may not notify the relay station 40 of the ACK/NACK. When receiving NACK from the terminal device 50, the relay station 40 retransmits data to the terminal device 50. On the other hand, when receiving NACK from the terminal device 50, the relay station 40 determines that the data transmission to the terminal device 50 is successful.

(C7) Transmission of Response Data from the Terminal Device 50 to the Base Station When receiving the downlink data, the terminal device 50 transmits ACK/NACK to the base station by direct communication. Here, the base station may notify, in advance, the terminal device 50 to which E2E HARQ ID the downlink data corresponds. To which E2E HARQ ID the downlink data corresponds may be determined in advance under a predetermined condition.

Sequence Example

The operation of the downlink data transmission of the communication system 1 in the downlink uni-directional relay is explained above. A sequence example of this operation is explained below.

Figure 19:
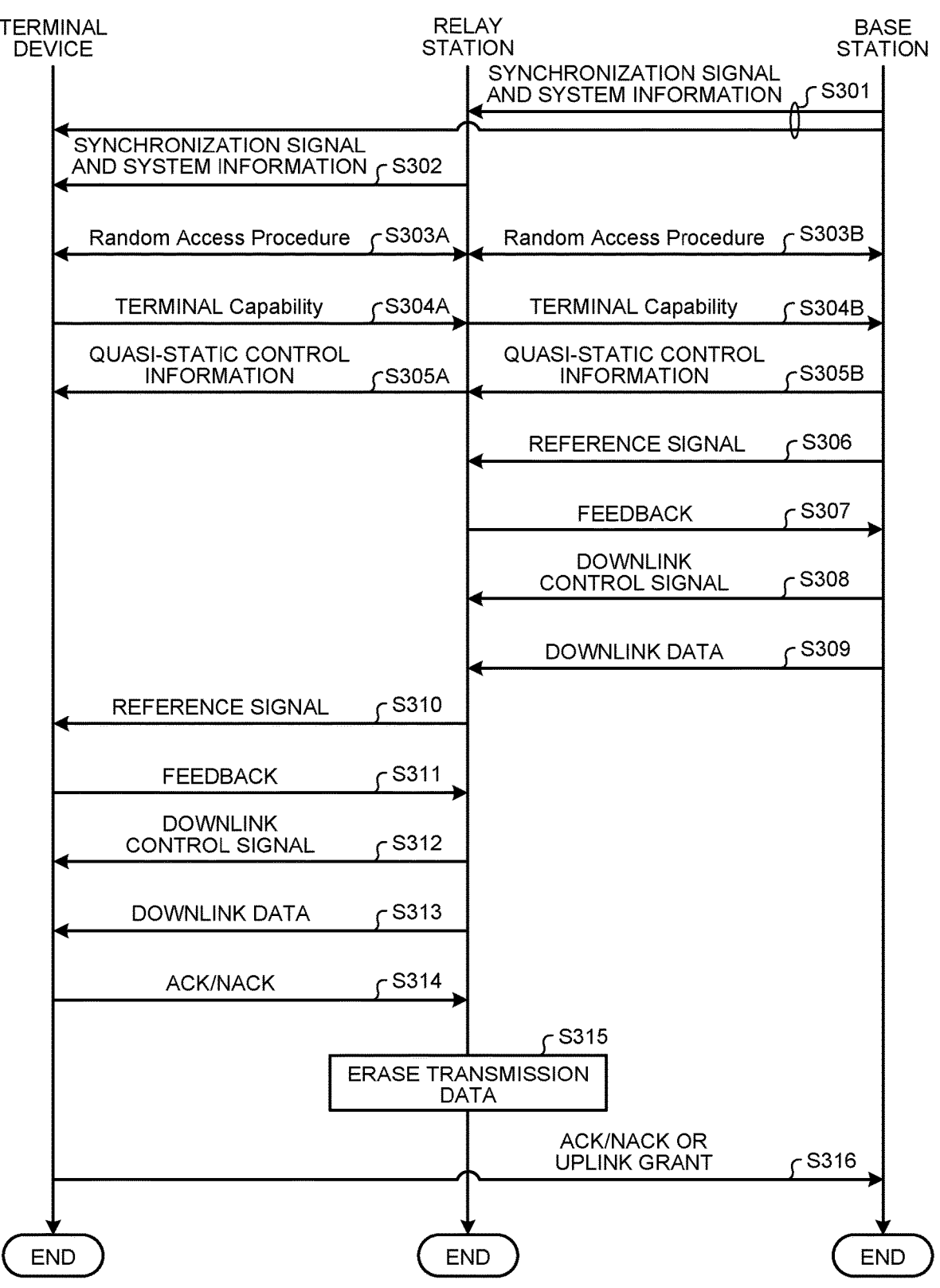
FIG. 19 is a sequence chart illustrating an operation of downlink data transmission of the communication system in the downlink uni-directional relay.

FIG. 19 is a sequence chart illustrating the operation of the downlink data transmission of the communication system 1 in the downlink uni-directional relay. The operation of the downlink data transmission of the communication system 1 in the downlink uni-directional relay is explained below with reference to FIG. 19.

First, the relay station 40 and the terminal device 50 receive a synchronization signal and system information from the base station (step S301). The terminal device 50 receives the synchronization signal and the system information from the relay station 40 (step S302). Then, each of the base station, the relay station 40, and the terminal device 50 executes a random access procedure (Steps S303A and S303B).

The terminal device 50 transmits its own capability information (hereinafter referred to as terminal capability information) to the relay station 40 (step S304A). The relay station 40 transmits the terminal capability information to the base station (step S304B).

Subsequently, the base station notifies the relay station 40 of quasi-static control information (step S305A). Then, the relay station 40 transmits the quasi-static control information to the terminal device 50 (step S305B). Here, the quasi-static control information may include the information explained in (C1) above. That is, the quasi-static information may include notification indicating that the ACK/NACK of the link between the base station and the relay station 40 is disabled. The quasi-static information may include notification indicating that the ACK/NACK between the relay station 40 and the terminal device 50 is enabled or disabled.

Subsequently, the base station transmits a reference signal for downlink channel state estimation to the relay station 40 (step S306). For example, the base station transmits a CSI-RS as the reference signal for downlink channel state estimation. When receiving the reference signal, the relay station 40 transmits downlink channel state feedback to the base station (step S307). The downlink channel state feedback is, for example, CSI feedback.

When receiving the feedback from the relay station 40, the base station transmits a downlink control signal to the relay station 40 (step 308). Here, the downlink control signal may include the information explained in (C2) above. That is, the downlink control signal may include information concerning the E2E HARQ ID.

Subsequently, the base station transmits downlink data to the relay station 40 (step S309). For example, the relay station 40 transmits the downlink data on the PDSCH. Here, as explained in (C3) above, the base station transmits the downlink data using the E2E HARQ ID. If the base station is the non-ground station 30, for example, the communication control unit 332 of the non-ground station 30 performs the transmission of the downlink data.

Note that, even when the base station receives the ACK from the relay station 40, the base station may not erase the downlink data transmitted to the relay station 40 from the buffer until the E2E transmission is completed (for example, until ACK is received in step S316 explained below).

Subsequently, the relay station 40 transmits a reference signal for downlink channel state estimation to the terminal device 50 (step S310). For example, the relay station 40 transmits a CSI-RS as a reference signal for downlink channel state estimation. When receiving the reference signal, the terminal device 50 transmits downlink channel state feedback to the relay station 40 (step S311). The downlink channel state feedback is, for example, CSI feedback).

When receiving the feedback from the terminal device 50, the relay station 40 transmits a downlink control signal to the terminal device 50 (step S312). Here, the downlink control signal may include the information explained in (C4) above. That is, the downlink control signal may include information concerning the E2E HARQ ID. The acquisition unit 531 of the terminal device 50 receives the downlink control signal including the information concerning the E2E HARQ ID from the relay station 40.

Subsequently, the relay station 40 transmits downlink data to the terminal device 50 (step S313). For example, the relay station 40 transmits the downlink data on the PDSCH. Here, as explained in (C5) above, the relay station 40 transmits the downlink data using the E2E HARQ ID.

When receiving the downlink data from the relay station 40, the terminal device 50 responds to the relay station 40. For example, the terminal device 50 transmits ACK/NACK to the relay station 40 as explained in (C6) above (step S314). Note that, when the ACK/NACK between the relay station 40 and the terminal device 50 is disabled, the terminal device 50 may not notify the relay station 40 of the ACK/NACK.

When receiving ACK from the terminal device 50, the relay station 40 deletes the uplink data from the buffer (step S315). When the ACK/NACK (the HARQ) of the link between the base station and the relay station 40 is disabled, the relay station 40 may also erase the uplink data from the buffer.

When receiving the downlink data from the relay station 40, the terminal device 50 also responds to the base station. For example, as explained in (C7) above, the terminal device 50 transmits ACK/NACK corresponding to the E2E HARQ ID to the base station (step S316).

According to this operation, since the base station can quickly learn success/failure of communication not via the relay station 40, the base station can quickly execute the retransmission processing. As a result, since a delay relating to the retransmission processing decreases, the communication system 1 can realize high communication performance.

3-3-2. Uplink Data Transmission

Next, an operation of uplink data transmission of the communication system 1 in the downlink uni-directional relay is explained. The operation of the uplink data transmission is divided into (D1) to (D5) described below. The base station, the relay station 40, or the terminal device 50 sequentially executes operations explained in (D1) to (D5) described above.

(D1) Disabling of an HARQ between the base station and the terminal device 50

(D2) Transmission of an uplink grant from the base station to the terminal device 50

(D3) Transmission of uplink data from the terminal device 50 to the base station (D4) Transmission of response data from the base station to the relay station 40

(D5) Relay transmission of response data from the relay station 40 to the terminal device 50

(D1) to (D5) described above are respectively explained below.

(D1) Disabling of an HARQ Between the Base Station and The Terminal Device 50

The base station may notify the terminal device 50 that ACK/NACK using a direct link between the terminal device 50 and the base station is disabled. When the disabling is notified, the base station does not perform ACK/NACK transmission using the direct link to the terminal device 50. That is, to transmit ACK/NACK for the uplink data transmitted from the terminal device 50, the base station transmits the ACK/NACK through the relay station 40.

Note that this disabling is disabling of ACK/NACK of the direct link between the base station and the terminal device 50 and is not disabling of the E2E ACK/NACK.

ACK/NACK of links between the relay station 40 and the terminal device 50 and between the relay station 40 and the base station is enabled. That is, E2E ACK/NACK via the relay station 40 is enabled.

(D2) Transmission of an Uplink Grant from the Base Station to the Terminal Device 50

Subsequently, the base station notifies the terminal device 50 of an uplink grant for performing uplink data transmission. Here, the base station notifies the terminal device 50 of the uplink grant via the relay station 40.

The uplink grant may include information concerning the E2E HARQ ID. Here, the E2E HARQ ID may be determined based on information acquired beforehand by the terminal device 50 from the base station.

Note that the information concerning the E2E HARQ ID may not be the E2E HARQ ID itself if the terminal device 50 can finally specify the E2E HARQ ID. The base station may explicitly notify or implicitly notify the terminal device 50 of the E2E HARQ ID.

(D3) Transmission of Uplink Data from the Terminal Device 50 to the Base Station When acquiring the uplink grant, the terminal device 50 transmits uplink data to the base station by direct communication. Here, the terminal device 50 transmits the uplink data with the E2E HARQ ID notified from the base station.

(D4) Transmission of Response Data from the Base Station to the Relay Station 40

When receiving the uplink data, the base station transmits, to the relay station 40, ACK/NACK corresponding to the HARQ ID of the E2E. The base station may notify, with DCI or the like, the relay station 40 of information concerning a resource for transmitting the ACK/NACK. The base station may transmit a control signal including information concerning the ACK/NACK transmission to the relay station 40.

(D5) Relay Transmission of Response Data from the Relay Station 40 to the Terminal Device 50

The relay station 40 relay-transmits the ACK/NACK corresponding to the E2E HARQ ID to the terminal device 50. The base station may notify the relay station 40 of the information concerning the resource for transmitting the ACK/NACK. The relay station 40 may transmit a control signal including information concerning the ACK/NACK transmission to the terminal device 50.

Sequence Example

The operation of the uplink data transmission of the communication system 1 in the downlink uni-directional relay is explained above. A sequence example of this operation is explained below.

Figure 20:
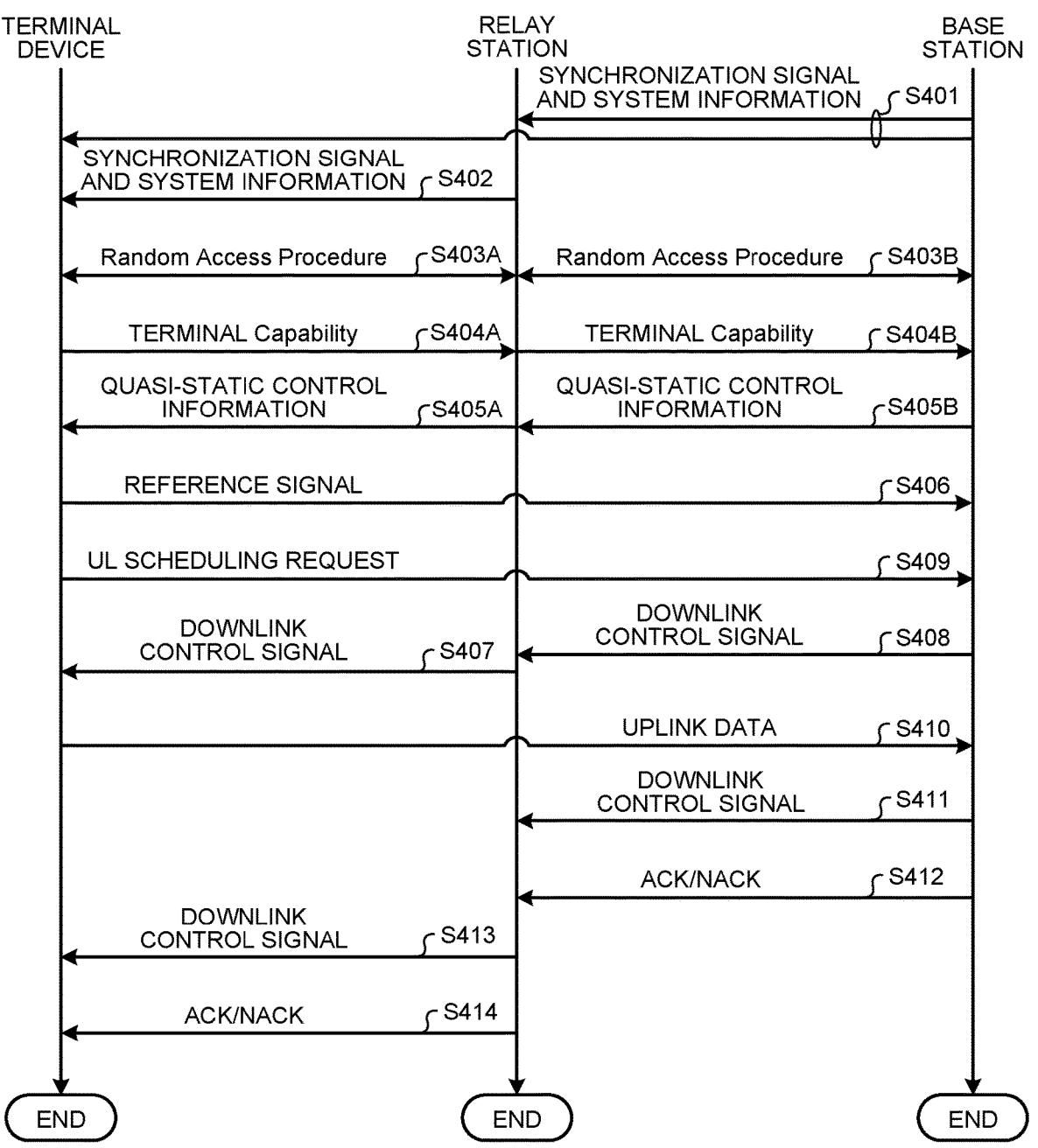
FIG. 20 is a sequence chart illustrating operation of uplink data transmission of the communication system in the downlink uni-directional relay.

FIG. 20 is a sequence chart illustrating the operation of the uplink data transmission of the communication system 1 in the downlink uni-directional relay. The operation of the uplink data transmission of the communication system 1 in the downlink uni-directional relay is explained with reference to FIG. 20.

First, the relay station 40 and the terminal device 50 receive a synchronization signal and system information from the base station (step S401). The terminal device 50 receives the synchronization signal and the system information from the relay station 40 (step S402). Then, each of the base station, the relay station 40, and the terminal device 50 executes a random access procedure (steps S403A and S403B).

The terminal device 50 transmits its own capability information (hereinafter referred to as terminal capability information) to the relay station 40 (step S404A). The relay station 40 transmits the terminal capability information to the base station (step S404B).

Subsequently, the base station notifies the relay station 40 of quasi-static control information (step S405A). Then, the relay station 40 transmits quasi-static control information to the terminal device 50 (step S405B). Here, the quasi-static control information may include the information explained in (D1) above. That is, the quasi-static information may include a notification indicating that the ACK/NACK of the link between the base station and the terminal device 50 is disabled. The quasi-static information may include a notification indicating that ACK/NACK between the relay station 40 and the terminal device 50 and between the relay station 40 and the base station is enabled or disabled.

Subsequently, the terminal device 50 transmits a reference signal for uplink channel state estimation to the base station (step S406). For example, the terminal device 50 transmits an SRS as the reference signal for uplink channel state estimation. Subsequently, the terminal device 50 transmits an uplink scheduling request to the base station (step S407).

When receiving the uplink scheduling request from the terminal device 50, the base station transmits a downlink control signal to the relay station 40 (step S408). Then, the relay station 40 relay-transmits the downlink control signal to the terminal device 50 (step S409). Here, the downlink control signal may include the information explained in (D2) above. That is, the downlink control signal may include information concerning an uplink grant. The information concerning the uplink grant may include information concerning the E2E HARQ ID. The acquisition unit 531 of the terminal device 50 receives the downlink control signal including the information concerning the E2E HARQ ID from the base station.

Subsequently, the terminal device 50 transmits uplink data to the base station (step S410). For example, the terminal device 50 transmits the downlink data on a physical downlink shared channel (PDSCH). Here, the terminal device 50 transmits the uplink data using the E2E HARQ ID as explained in (B3) above. For example, the communication control unit 532 of the terminal device 50 transmits the uplink data.

Next, the base station transmits a downlink control signal to the relay station 40 (step S411). The downlink control signal may include information concerning a resource relating to transmission of ACK/NACK. Then, the base station transmits a response to the uplink data to the relay station 40 (step S412). For example, as explained in (D4) above, the terminal device 50 transmits ACK/NACK corresponding to the E2E HARQ ID to the relay station 40.

Subsequently, the relay station 40 transmits a downlink control signal to the terminal device 50 (step S413). The downlink control signal may include information concerning a resource relating to transmission of ACK/NACK. Then, the relay station 40 transfers the response from the base station to the terminal device 50 (step S414). For example, as explained in (D5) above, the relay station 40 transmits the ACK/NACK corresponding to the E2E HARQ ID to the terminal device 50.

According to this operation, the base station can reliably transmit, to the terminal device 50, via the relay station 40, the response to the uplink data by the direct communication from the terminal device 50.

3-4. Conclusion and Supplementation

The operation of the communication system 1 of the present embodiment is explained above. A summary and supplementation of the operation of the communication system 1 are explained below.

3-4-1. Definition of an HARQ ID for the E2E

As explained above, the communication system 1 is the communication system in which the communication between the non-ground station 30 and the terminal device 50 is the uni-directional relay communication. The communication system 1 introduces an E2E HARQ ID (End-to-End) used between the terminal device 50 and the base station. Here, the E2E HARQ ID is an HARQ ID between the terminal device 50 and the base station different from an HARQ ID of at least one of an HARQ ID for communication between the terminal device 50 and the relay station 40 and an HARQ ID for communication between the base station and the relay station 40.

(1) Uplink Uni-Directional Relay (in the Case of Uplink Data Transmission)

In the case of uplink data transmission of the uplink uni-directional relay, the communication system 1 introduces an E2E HARQ ID between the terminal device 50 and the base station different from the HARQ ID for the communication between the base station and the relay station 40. Here, the E2E HARQ ID may be the same ID as the HARQ ID used for the communication between the terminal device 50 and the relay station 40 or may be another ID.

For example, the HARQ ID used for the communication between the base station and the relay station 40 is represented as $ID_A$ and the E2E HARQ ID used between the terminal device 50 and the base station is represented as $ID_B$. In this case, the relay station 40 performs communication according to the $ID_B$ in the communication with the terminal device 50. At this time, the relay station 40 may notify the terminal device 50 of an uplink grant including information concerning the $ID_B$ beforehand. The terminal device 50 transmits uplink data to the relay station 40 using the $ID_B$.

When receiving the uplink data from the terminal device 50, the relay station 40 carries out relay transmission of the uplink data to the base station with the $ID_A$. At this time, the relay station 40 may include the information concerning the $ID_B$ in transmission data to the base station. The relay station 40 may notify the base station of the information concerning the $ID_B$ as control information.

When receiving the uplink data from the relay station 40, the base station transmits information concerning ACK/NACK for the $ID_B$ to the terminal device 50 with the direct link. If a response of the base station is ACK, the terminal device 50 transmits a scheduling request for next data first transmission to the relay station 40. On the other hand, if the response of the base station is NACK, the terminal device 50 transmits a scheduling request for retransmission to the relay station 40. At this time, the terminal device 50 may transmit the information concerning the $ID_B$ to the relay station 40 together with the scheduling request.

(2) Uplink Uni-Directional Relay (in the Case of Downlink Data Transmission)

In the case of downlink data transmission of the uplink uni-directional relay, the communication system 1 introduces an E2E HARQ ID between the terminal device 50 and the base station different from an HARQ ID for communication between the terminal device 50 and the relay station 40 and an HARQ ID for communication between the base station and the relay station 40. Here, the base station does not perform other data transmission with an HARQ ID used in the downlink data transmission until the E2E transmission is completed.

(3) Downlink Uni-Directional Relay (in the Case of Downlink Data Transmission)

In the case of downlink data transmission of the downlink uni-directional relay, the communication system 1 introduces an E2E HARQ ID between the terminal device 50 and the base station different from an HARQ ID for the communication between the terminal device 50 and the relay station 40. Here, the E2E HARQ ID may be the same ID as the HARQ ID used for the communication between the base station and the relay station 40 or may be another ID.

For example, the HARQ ID used for the communication between the terminal device 50 and the relay station 40 is represented as $ID_A$ and the E2E HARQ ID used between the terminal device 50 and the base station is represented as $ID_B$. In this case, the relay station 40 performs communication according to the $ID_B$ in the communication with the base station. At this time, the base station may notify the relay station 40 of downlink control information (for example, DCI) including information concerning the $ID_B$ beforehand. The base station transmits downlink data to the relay station 40 using the $ID_B$.

When receiving the downlink data from the base station, the relay station 40 carries out relay transmission of the downlink data to the terminal device 50 with the $ID_A$. At this time, the relay station 40 may include the information concerning the $ID_B$ in transmission data to the terminal device 50. The relay station 40 may notify the terminal device 50 of the information concerning the $ID_B$ as control information.

When receiving the downlink data from the relay station 40, the terminal device 50 transmits information concerning ACK/NACK for the $ID_B$ to the base station with the direct link. When a response of the terminal device 50 is ACK, the base station transmits downlink control information for next data first transmission to the relay station 40. On the other hand, if the response of the terminal device 50 is NACK, the base station transmits downlink control information for retransmission to the relay station 40. At this time, the terminal device 50 may transmit the information concerning the ID B to the relay station 40 together with the downlink control information.

(4) Downlink Uni-Directional Relay (in the Case of Uplink Data Transmission)

In the case of uplink data transmission of the downlink uni-directional relay, the communication system 1 introduces an E2E HARQ ID between the terminal device 50 and the base station different from an HARQ ID for the communication between the terminal device 50 and the relay station 40 and an HARQ ID for the communication between the base station and the relay station 40. Here, the terminal device 50 does not perform other data transmission with an HARQ ID used in the uplink data transmission until E2E transmission is completed.

3-4-2. Notification of Information Between the Terminal Device and the Relay Station by the Base Station The base station may notify the terminal device 50 of an uplink grant or downlink control information between the terminal device 50 and the relay station 40.

(1) Uplink Grant

The base station transmits a grant for uplink data transmission to the relay station 40 by the terminal device 50 while addressing the grant to the terminal device 50. At this time, the relay station 40 may receive the grant for the uplink data transmission addressed to the terminal device 50. Note that the relay station 40 does not use this grant for transmission of uplink data from the relay station 40 to the base station.

After transmitting the uplink data to the relay station 40, the terminal device 50 receives information concerning retransmission from the relay station 40. Here, the base station is responsible for execution of an E2E HARQ and the relay station 40 is responsible for execution of an HARQ between the terminal device 50 and the relay station 40. For example, the relay station 40 transmits an uplink grant concerning first transmission of E2E transmission between the terminal device 50 and the relay station 40. On the other hand, the base station transmits an uplink grant concerning retransmission of the E2E transmission or first transmission of the next data between the terminal device 50 and the relay station 40.

When the terminal device 50 receives the uplink grant concerning the retransmission or the uplink grant concerning the first transmission of the next data from the base station, a part of processing can be reduced. For example, it is possible to reduce a step in which the terminal device 50 transmits a scheduling request to the relay station 40 and receives an uplink grant from the relay station 40.

(2) Downlink Control Information

The base station transmits, to the terminal device 50, control information (for example, DCI) at the time when the relay station 40 transmits downlink data to the terminal device 50. At this time, the relay station 40 may receive downlink control information transmitted to the terminal device 50. The relay station 40 transmits the downlink data to the terminal device 50 according to the received downlink control information. Note that the relay station 40 does not use the downlink control information for processing of data transmitted from the terminal device 50.

Since the terminal device 50 receives the downlink control information from the base station, a step in which the relay station 40 transmits the downlink control information to the terminal device 50 becomes unnecessary. Consequently, the communication system 1 can reduce the frequency resources used for the transmission of the downlink control information in ground communication.

3-4-3. Processing in the Case in which Handover Occurs

When handover occurs during implementation of the processing (for example, the processing explained in <3-1> to <3-4>) of the present embodiment, the communication system 1 executes processing explained below.

For example, the base station notifies the terminal device and/or the relay station 40 of update information concerning an E2E HARQ ID. The base station that notifies the update information may be a handover source base station or a handover destination base station.

Here, the update information concerning the E2E HARQ ID is, for example, link information between an E2E HARQ ID used in the handover source base station and an E2E HARQ ID used in the handover destination base station. When the same ID is used, the update information may be information indicating the ID is the same. The update information concerning the E2E HARQ ID may be, for example, information for notifying the terminal device 50 and/or the relay station 40 that retransmission is performed from first transmission.

3-4-4. Frequency Band Example of Links

In the present embodiment, three links are assumed: (1) a link between the terminal and the relay station 40; (2) a link between the relay station 40 and the base station; and (3) a link between the base station and the terminal device 50. Frequency bands of the links may be different in all of the three links or the same frequency band may be used in a plurality of links among the three links.

For example, (1) for example, a frequency band allocated to ground communication is used between the terminal and the relay station 40, (2) for example, a Ka band for satellite communication is used between the relay station 40 and the base station (for example, a satellite), and (3) for example, an S band for satellite communication is used between the base station (For example, a satellite) and the terminal device 50.

4. Modifications

The embodiment explained above indicates an example and various changes and applications of the embodiment are possible.

For example, in the embodiment explained, an example in which all the data are transmitted by the uni-directional relay is explained. However, not all the data may be transmitted by the uni-directional relay. For example, the communication system 1 may switch uni-directional relay and bidirectional direct communication. Here, the bidirectional direct communication is communication in which both of an uplink and a downlink are direct links. The communication system 1 may switch the uni-directional relay and the bidirectional direct communication according to a transmission channel. For example, among transmission channels between the base station and the terminal device 50, the communication system 1 uses a PDSCH and a PUSCH for the uni-directional relay and uses a PDCCH and a PUSCH for the bidirectional direct communication. That is, the base station performs uni-directional relay communication with the terminal device 50 by using the end-to-end HARQ ID when communication data is user data and performs the bidirectional direct communication with the terminal device 50 when the communication data is control data. For example, the communication system 1 may switch the uni-directional relay and bidirectional relay communication. The bidirectional relay communication may be reworded as relay communication. In the bidirectional relay communication, the terminal device performs communication via a relay station in both of the uplink and the downlink.

A control device that controls the management device 10, the ground station 20, the non-ground station 30, the relay station 40, and the terminal device 50 of the present embodiment may be realized by a dedicated computer system or may be realized by a general-purpose computer system.

For example, a communication program for executing the operation explained above is distributed by being stored in a computer-readable recording medium such as an optical disk, a semiconductor memory, a magnetic tape, or a flexible disk. Then, for example, the program is installed in a computer and the control device is configured by executing the processing explained above. At this time, the control device may be a device (for example, a personal computer) on the outside of the management device 10, the ground station 20, the non-ground station 30, the relay station 40, or the terminal device 50. The control device may be a device (for example, the control unit 13, the control unit 23, the control unit 33, the control unit 43, or the control unit 53) on the inside of the management device 10, the ground station 20, the non-ground station 30, the relay station 40, or the terminal device 50.

The communication program explained above may be stored in a disk device included in a server device on a network such as the Internet such that the communication program can be downloaded to a computer. The functions explained above may be realized by cooperation of an OS (Operating System) and application software. In this case, a portion other than the OS may be stored in a medium and distributed or a portion other than the OS may be stored in the server device and downloaded to the computer.

Among the processing explained in the embodiment, all or a part of the processing explained as being automatically performed can be manually performed or all or a part of the processing explained as being manually performed can be automatically performed by a known method. Besides, the processing procedure, the specific names, and the information including the various data and parameters explained in the document and illustrated in the drawings can be optionally changed except when specifically noted otherwise. For example, the various kinds of information illustrated in the figures are not limited to the illustrated information.

The illustrated components of the devices are functionally conceptual and are not always required to be physically configured as illustrated in the figures. That is, specific forms of distribution and integration of the devices are not limited to the illustrated forms and all or a part thereof can be functionally or physically distributed and integrated in any unit according to various loads, usage situations, and the like.

The embodiments explained above can be combined as appropriate in a range for not causing the processing contents to contradict one another. Furthermore, the order of the steps illustrated in the flowchart of the embodiment explained above can be changed as appropriate.

For example, the present embodiment can be realized as any component configuring a device or a system, for example, a processor functioning as a system LSI (Large Scale Integration) or the like, a module that uses a plurality of processors or the like, a unit that uses a plurality of modules or the like, or a set obtained by further adding other functions to the unit (that is, a component as a part of the device).

Note that, in the present embodiment, the system means a set of a plurality of components (devices, modules (parts), and the like) It does not matter whether all the components are present in the same housing. Therefore, both of a plurality of devices housed in separate housings and connected via a network and one device in which a plurality of modules are housed in one housing are systems.

For example, the present embodiment can adopt a configuration of cloud computing in which one function is shared and processed by a plurality of devices in cooperation via a network.

5. Conclusion

As explained above, according to the embodiment of the present disclosure, the communication device (the base station or the terminal device 50) communicates with another communication device (the base station or the terminal device 50) using an end-to-end HARQ ID in uni-directional relay communication via the relay station 40. Consequently, the communication device can perform end-to-end retransmission processing in a PHY layer and a MAC layer even in an environment in which an HARQ between the base station and the relay station 40 is disabled. Since the communication device can quickly learn success/failure of communication not via the relay station 40, the communication device can quickly execute the retransmission processing. As a result, since a delay relating to the retransmission processing decreases, the communication device can realize high communication performance.

Although the embodiments of the present disclosure explained above, the technical scope of the present disclosure is not limited to the embodiments per se. Various changes can be made without departing from the gist of the present disclosure. Components in different embodiments and modifications may be combined as appropriate.

The effects in the embodiments described in this specification are only illustrations and are not limited. Other effects may be present.

Note that the present technique can also take the following configurations.

(1)

A communication device that performs uni-directional relay communication in which one communication of uplink communication and downlink communication with another communication device is relay communication via a relay station and other communication is direct communication, the communication device acquiring an HARQ ID different from at least one of an HARQ ID for communication between the other communication device and the relay station and an HARQ ID for communication between the communication device and the relay station, the HARQ ID being used in end-to-end between the other communication device and the communication device in the uni-directional relay communication.

(2)

The communication device according to (1), wherein the other communication device is a base station, and the communication device is a terminal device.

(3)

The communication device according to (2), wherein the communication device is the terminal device capable of using the uni-directional relay communication in which the uplink communication with the base station is the relay communication via the relay station and the downlink communication is the direct communication, and the communication device acquires an HARQ ID different from an HARQ ID for communication between the base station and the relay station, the HARQ ID being used in the end-to-end between the base station and the communication device in the uni-directional relay communication and performs the uplink communication with the base station using the HARQ ID used in the end-to-end.

(4)

The communication device according to (3), wherein the communication device communicates with the relay station using the HARQ ID used in the end-to-end in the uplink communication with the base station and receives acknowledgement or negative acknowledgement corresponding to the HARQ ID used in the end-to-end in the direct communication from the base station.

(5)

The communication device according to (4), wherein even if the acknowledgement corresponding to the HARQ ID used in the end-to-end is received from the relay station, the communication device does not erase transmission data corresponding to the HARQ ID used in the end-to-end until the acknowledgement or the negative acknowledgement corresponding to the HARQ ID used in the end-to-end in the direct communication is received from the base station.

(6)

The communication device according to (4) or (5), wherein the communication device acquires, from the relay station, a grant for the uplink communication including the HARQ ID used in the end-to-end.

(7)

The communication device according to any one of (3) to (6), wherein the other communication device is a non-ground base station.

(8)

The communication device according to any one of (2) to (7), wherein the communication device is the terminal device capable of using the uni-directional relay communication in which the uplink communication with the base station is the relay communication via the relay station and the downlink communication is the direct communication, and the communication device performs the downlink communication with the base station using the HARQ ID used in the end-to-end.

(9)

The communication device according to (2), wherein the communication device is the terminal device capable of using the uni-directional relay communication in which the downlink communication with the base station is the relay communication via the relay station and the uplink communication is the direct communication, and the communication device acquires an HARQ ID different from the HARQ ID for the communication between the communication device and the relay station, the HARQ ID being used in the end-to-end between the base station and the communication device in the uni-directional relay communication and performs the downlink communication with the base station by using the HARQ ID used in the end-to-end.

(10)

The communication device according to (2) or (9), wherein the communication device is the terminal device capable of using the uni-directional relay communication in which the downlink communication with the base station is the relay communication via the relay station and the downlink communication is the direct communication, and the communication device performs the uplink communication with the base station using the HARQ ID used in the end-to-end.

(11)

The communication device according to (1), wherein the other communication device is a terminal device, the communication device is a base station capable of using the uni-directional relay communication in which one communication of uplink communication and downlink communication with the terminal device is the relay communication via the relay station and the other communication is the direct communication, and the communication device acquires the HARQ ID different from at least one HARQ ID of an HARQ ID for communication between the terminal device and the relay station and an HARQ ID for communication between the communication device and the relay station, the HARQ ID being used in the end-to-end between the terminal device and the communication device in the uni-directional relay communication, and performs the uplink communication or the downlink communication with the terminal device using the HARQ ID used in the end-to-end.

(12)

The communication device according to (11), wherein the communication device is the base station capable of using the uni-directional relay communication in which the uplink communication with the terminal device is the relay communication via the relay station and the downlink communication is the direct communication, and the communication device acquires an HARQ ID different from the HARQ ID for the communication between the communication device and the relay station, the HARQ ID being used in the end-to-end between the terminal device and the communication device in the uni-directional relay communication and performs the uplink communication with the terminal device by using the HARQ ID used in the end-to-end.

(13)

The communication device according to (12), wherein the communication device is a non-ground base station capable of using the uni-directional relay communication in which the uplink communication with the terminal device is the relay communication via the relay station and the downlink communication is the direct communication.

(14)

The communication device according to any one of (11) to (13), wherein the communication device is the base station in which the uplink communication with the terminal device is the relay communication via the relay station and the downlink communication is the direct communication, and the communication device performs the downlink communication with the terminal device by using the HARQ ID used in the end-to-end.

(15)

The communication device according to (11) wherein the communication device is the base station capable of using the uni-directional relay communication in which the downlink communication with the terminal device is the relay communication via the relay station and the uplink communication is the direct communication, and the communication device acquires an HARQ ID different from the HARQ ID for the communication between the terminal device and the relay station, the HARQ ID being used in the end-to-end between the terminal device and the communication device in the uni-directional relay communication and performs the downlink communication with the terminal (16)

The communication device according to (11) or (15), wherein the communication device is the base station capable of using the uni-directional relay communication in which the downlink communication with the terminal device is the relay communication via the relay station and the downlink communication is the direct communication, and the communication device performs the uplink communication with the terminal device by using the HARQ ID used in the end-to-end.

(17)

The communication device according to any one of (1) to (16), wherein the communication device is capable of using, in addition to the uni-directional relay communication, bidirectional direct communication in which both the uplink communication and the downlink communication are the direct communication, and when communication data is user data, the communication device performs the uni-directional relay communication with the other communication device using the HARQ ID used in the end-to-end and, when the communication data is control data, the communication device performs the bidirectional direct communication with the other communication device.

(18)

A communication method executed by a communication device capable of using uni-directional relay communication in which one communication of uplink communication and downlink communication with another communication device is relay communication via a relay station and other communication is direct communication, the communication method comprising acquiring an HARQ ID different from an HARQ ID for communication between the other communication device and the relay station or between the communication device and the relay station, the HARQ ID being used in end-to-end between the other communication device and the communication device in the uni-directional relay communication.

(19)

A communication system comprising: a base station; a relay station; and a terminal device capable of using uni-directional relay communication in which one communication of uplink communication and downlink communication with the base station is relay communication via the relay station and other communication is direct communication, wherein the base station acquires an HARQ ID different from at least one of an HARQ ID for communication between the terminal device and the relay station and an HARQ ID for communication between the base station and the relay station, the HARQ ID being used in end-to-end between the terminal device and the base station in the uni-directional relay communication and performs the uplink communication or the downlink communication with the terminal device using the HARQ ID used in the end-to-end, and the terminal device acquires the HARQ ID used in the end-to-end and performs the uplink communication or the downlink communication with the base station using the HARQ ID used in the end-to-end.

(20)

The communication system according to (19), wherein the terminal device is capable of using the uni-directional relay communication in which the uplink communication with the base station is the relay communication via the relay station and the downlink communication is the direct communication, the base station disables an HARQ between the base station and the relay station when the terminal device performs the uplink communication via the relay station, and the relay station transmits, to the base station, uplink data transmitted from the terminal device and thereafter erases the uplink data without retaining the uplink data.

REFERENCE SIGNS LIST

1 COMMUNICATION SYSTEM
10 MANAGEMENT DEVICE
20 GROUND STATION
30 NON-GROUND STATION
40 RELAY STATION
50 TERMINAL DEVICE
11 COMMUNICATION UNIT
21, 31, 41, 51 WIRELESS COMMUNICATION UNIT
12, 22, 32, 42, 52 STORAGE UNIT
13, 23, 33, 43, 53 CONTROL UNIT
24, 44 NETWORK COMMUNICATION UNIT
211, 311, 411, 511 RECEPTION PROCESSING UNIT
212, 312, 412, 512 TRANSMISSION PROCESSING UNIT
213, 313, 413, 513 ANTENNA
331, 531 ACQUISITION UNIT
332, 532 COMMUNICATION CONTROL UNIT

The invention claimed is:

1. A first communication device, comprising:

circuitry configured to:

acquire an end-to-end Hybrid Automatic Repeat Request (HARQ) process ID;

perform uni-directional relay communication based on the acquired end-to-end HARQ process ID, wherein the uni-directional relay communication includes:

first uplink communication as relay communication between the first communication device and a second communication device via a relay station; and first downlink communication as direct communication between the first communication device and the second communication device, or second uplink communication as the direct communication between the first communication device and the second communication device via the relay station; and second downlink communication as the relay communication between the first communication device and the second communication device, the end-to-end HARQ process ID is different from at least one of a first HARQ process ID or a second HARQ process ID, the first HARQ process ID is for communication between the second communication device and the relay station, and the second HARQ process ID is for communication between the first communication device and the relay station; and perform, based on the acquired end-to-end HARQ process ID, one of the first uplink communication or the second downlink communication with the second communication device.

2. The first communication device according to claim 1, wherein the second communication device is a base station, and the first communication device is a terminal device.

3. The first communication device according to claim 2, wherein the acquired end-to-end HARQ process ID is different from the first HARQ process ID for the communication between the base station and the relay station and the circuitry is further configured to perform, based on the acquired end-to-end HARQ process ID, the first uplink communication with the base station.

4. The first communication device according to claim 3, wherein the circuitry is further configured to:

perform, based on the acquired end-to-end HARQ process ID, communication with the relay station in the first uplink communication with the base station; and receive, from the base station, one of a first acknowledgement corresponding to the acquired end-to-end HARQ process ID or a negative acknowledgement corresponding to the acquired end-to-end HARQ process ID.

5. The first communication device according to claim 4, wherein the circuitry is further configured to:

receive, from the relay station, a second acknowledgement corresponding to the acquired end-to-end HARQ process ID;

retain, independent of the reception of the second acknowledgement, transmission data corresponding to the acquired end-to-end HARQ process ID; and delete the transmission data based on the reception of one of the first acknowledgement or the negative acknowledgement.

6. The first communication device according to claim 4, wherein the circuitry is further configured to acquire, from the relay station, a grant for the first uplink communication, and the grant for the first uplink communication including the end-to-end HARQ process ID.

7. The first communication device according to claim 3, wherein the base station is a non-terrestrial base station.

8. The first communication device according to claim 2, wherein circuitry is further configured to perform the first downlink communication with the base station based on the acquired end-to-end HARQ process ID.

9. The first communication device according to claim 2, wherein the acquired end-to-end HARQ process ID is different from the second HARQ process ID, and the circuitry is further configured to perform the first downlink communication with the base station based on the acquired end-to-end HARQ process ID.

10. The first communication device according to claim 2, wherein the circuitry is further configured to perform the first uplink communication with the base station based on the acquired end-to-end HARQ process ID.

11. The first communication device according to claim 1, wherein the second communication device is a terminal device, and the first communication device is a base station.

12. The first communication device according to claim 11, wherein the acquired end-to-end HARQ process ID is different from the first HARQ process ID, and the circuitry is further configured to perform the first uplink communication with the terminal device based on the acquired end-to-end HARQ process ID.

13. The first communication device according to claim 12, wherein the base station is a non-terrestrial base station.

14. The first communication device according to claim 11, wherein the circuitry is further configured to perform the first downlink communication with the terminal device based on the acquired end-to-end HARQ process ID.

15. The first communication device according to claim 11, wherein the acquired end-to-end HARQ process ID is different from the first HARQ process ID, and the circuitry is further configured to perform the first downlink communication with the terminal device based on the acquired end-to-end HARQ process ID.

16. The first communication device according to claim 11, wherein the circuitry is further configured to perform the first uplink communication with the terminal device based on the acquired end-to-end HARQ process ID.

17. The first communication device according to claim 1, wherein the circuitry is further configured to:

determine that first communication data is user data;

perform the uni-directional relay communication with the second communication device based on the acquired end-to-end HARQ process ID and the determination that the first communication data is the user data;

determine that second communication data is control data; and perform bidirectional direct communication with the second communication device, wherein the bidirectional direct communication includes:

third uplink communication as the direct communication between the first communication device and the second communication device; and third downlink communication as the direct communication between the first communication device and the second communication device.

18. A communication method comprising:

acquiring an end-to-end Hybrid Automatic Repeat Request (HARQ) process ID;

performing uni-directional relay communication based on the acquired end-to-end HARQ process ID, wherein the uni-directional relay communication includes:

first uplink communication as relay communication between a first communication device and a second communication device via a relay station; and first downlink communication as direct communication between the first communication device and the second communication device; or second uplink communication as the direct communication between the first communication device and the second communication device via the relay station; and second downlink communication as the relay communication between the first communication device and the second communication device, the end-to-end HARQ process ID is different from at least one of a first HARQ process ID or a second HARQ process ID, the first HARQ process ID is for communication between the second communication device and the relay station, and the second HARQ process ID if for communication between the first communication device and the relay station; and performing, based on the acquired end-to-end HARQ process ID, one of the first uplink communication or the second downlink communication with the second communication device.

19. A communication system, comprising:
a first communication device;
a second communication device;
a relay station;
a terminal device; and
a base station configured to:
  acquire an end-to-end Hybrid Automatic Repeat Request (HARQ) process ID;
  perform, based on the acquired end-to-end HARQ process ID, uni-directional relay communication with the terminal device, wherein
    the uni-directional relay communication includes:
      first uplink communication as relay communication between the base station and the terminal device via the relay station; and
      first downlink communication as direct communication between the base station and the terminal device, or second uplink communication as the direct communication between the first communication device and the second communication device via the relay station; and second downlink communication as the relay communication between the first communication device and the second communication device, the end-to-end HARQ process ID is different from at least one of a first HARQ process ID or a second HARQ process ID, the first HARQ process ID is for communication between the terminal device and the relay station, and the second HARQ process ID is for communication between the base station and the relay station; and perform, based on the acquired end-to-end HARQ process ID, the first uplink communication or the second downlink communication with the base station.

20. The communication system according to claim 19, wherein the terminal device is configured to execute the first uplink communication with the base station via the relay station, to transmit uplink data, the base station is further configured to disable, based on the execution of the first uplink communication via the relay station, an HARQ process between the base station and the relay station, and the relay station is configured to:
  transmit, to the base station, the uplink data from the terminal device; and
  delete the uplink data based on the transmission of the uplink data to the base station.

* * * * *